US010682810B2

(12) United States Patent
Rudisill et al.

(10) Patent No.: US 10,682,810 B2
(45) Date of Patent: Jun. 16, 2020

(54) THREE-DIMENSIONAL (3D) PRINTING

(71) Applicant: HEWLETT-PACKARD DEVELOPMENT COMPANY, L.P., Houston, TX (US)

(72) Inventors: Stephen G. Rudisill, San Diego, CA (US); Vladek Kasperchik, Corvallis, OR (US); Alexey S. Kabalnov, San Diego, CA (US); Shannon Reuben Woodruff, San Diego, CA (US); Thomas M. Sabo, San Diego, CA (US); Jake Wright, San Diego, CA (US); Hector Lebron, San Diego, CA (US); Vanessa Verzwyvelt, Vancouver, WA (US); Morgan T. Schramm, Portland, OR (US); Matthew A. Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/051,361

(22) Filed: Jul. 31, 2018

(65) Prior Publication Data
US 2018/0333914 A1 Nov. 22, 2018

Related U.S. Application Data

(63) Continuation of application No. PCT/US2016/058684, filed on Oct. 25, 2016.

(51) Int. Cl.
*B29C 67/00* (2017.01)
*B29C 64/165* (2017.01)
(Continued)

(52) U.S. Cl.
CPC .......... *B29C 64/165* (2017.08); *B22F 1/0022* (2013.01); *B29C 67/0007* (2013.01);
(Continued)

(58) Field of Classification Search
CPC .................................................. B29C 64/165
See application file for complete search history.

(56) References Cited

U.S. PATENT DOCUMENTS 5,204,055 A 4/1993 Sachs et al.
5,973,026 A * 10/1999 Burns ..................... C09D 11/38
106/31.6
(Continued)

FOREIGN PATENT DOCUMENTS

CA 2927249 4/2015
EP 1724110 11/2006
WO WO-2007114895 10/2007

OTHER PUBLICATIONS

Takeda et al., "Near Infrared Absorption of Tungsten Oxide Nanoparticle Dispersions", J. Am. Ceram. Soc., 90 [12] p. 4059-4061 (2007) (Year: 2007).*
(Continued)

*Primary Examiner* — Galen H Hauth
(74) *Attorney, Agent, or Firm* — Dierker & Kavanaugh PC

(57) ABSTRACT

In an example of a three-dimensional printing method, a polymeric build material is applied. A fusing agent is selectively applied on at least a portion of the polymeric build material. The fusing agent includes cesium tungsten oxide nanoparticles, a zwitterionic stabilizer, and an aqueous vehicle. The polymeric build material is exposed to electromagnetic radiation to fuse the portion of the polymeric build material in contact with the fusing agent to form a layer.

18 Claims, 10 Drawing Sheets

(51) Int. Cl.
*C09D 11/322* (2014.01)
*C09D 1/00* (2006.01)
*C09D 11/101* (2014.01)
*C09D 11/328* (2014.01)
*B22F 1/00* (2006.01)
*B82B 3/00* (2006.01)
*B33Y 70/00* (2020.01)
*B33Y 10/00* (2015.01)

(52) U.S. Cl.
CPC .............. *B82B 3/0038* (2013.01); *C09D 1/00* (2013.01); *C09D 11/101* (2013.01); *C09D 11/322* (2013.01); *C09D 11/328* (2013.01); *B33Y 10/00* (2014.12); *B33Y 70/00* (2014.12)

(56) References Cited

U.S. PATENT DOCUMENTS

| | | | |
|---|---|---|---|
| 7,007,872 | B2 | 3/2006 | Yadav et al. |
| 7,708,974 | B2 * | 5/2010 | Yadav ................ B82Y 30/00 250/462.1 |
| 7,972,426 | B2 | 7/2011 | Hinch et al. |
| 8,651,190 | B2 | 2/2014 | Hinch et al. |
| 8,651,390 | B2 | 2/2014 | Hinch et al. |
| 9,234,110 | B2 | 1/2016 | Katoh et al. |
| 9,643,359 | B2 | 5/2017 | Baumann et al. |
| 2007/0238056 | A1 * | 10/2007 | Baumann .............. B29C 64/165 430/325 |
| 2007/0241482 | A1 | 10/2007 | Giller et al. |
| 2013/0072615 | A1 | 3/2013 | Muro et al. |
| 2015/0298394 | A1 * | 10/2015 | Sheinman .............. B33Y 30/00 427/402 |
| 2016/0263829 | A1 * | 9/2016 | Okamoto ............... B33Y 10/00 |

OTHER PUBLICATIONS

Dong-chu, C et al., Preparation of Nano-WO_3 by Thermal Decomposition and Study of its Grain Characteristics and Dispersion Behavior, 2007, www.en.cnki.com.cn.
International Search Report and Written Opinion for International Publication No. PCT/US2016/058684 dated Aug. 24, 2017, 9 pages.
Faraday, Michael. "X. The Bakerian Lecture.—Experimental relations of gold (and other metals) to light," Philosophical Transactions of the Royal Society of London 147 (1857): 145-181.
Garcia, Guillermo, et al. "Dynamically modulating the surface plasmon resonance of doped semiconductor nanocrystals." Nano letters 11.10 (2011): 4415-4420.
Gross, Bethany C., et al. "Evaluation of 3D printing and its potential impact on biotechnology and the chemical sciences," (2014): 3240-3253.
Kanehara, Masayuki, et al. "Indium tin oxide nanoparticles with compositionally tunable surface plasmon . . . " Jrnl of the Amer Chem Society 131.49, 200,: 17736-17737.
Milligan, W. O., and R. H. Morriss. "Morphology of Colloidal Gold—A Comparative Study." Journal of the American Chemical Society 86.17 (1964): 3461-3467.
Usui, Hiroyuki, Takeshi Sasaki, and Naoto Koshizaki. "Optical transmittance of indium tin oxide nanoparticies prepared by laser-induced fragmentation in water," The Journal of Physical Chemistry B 110.26 (2006): 12890-12895.
Van der Zande, Bianca Ml. et al. "Aqueous gold sols of rod-shaped particles." The Journal of Physical Chemistry B 101.6 (1997): 852-854.
Weiser, H., et al., "Von Weimark's Precipitation Theory and the Formation of Colloidal Gold", 10 pages, The Rice Institute: Houston, TX.
Milligan, W.O., et al., "Morphology of Colloidal Gold—A Comparative Study", vol. 86, 1964, pp. 3461-3467.
Faraday, M., "X. The Bakerian Lecture.—Experimental relations of gold (and other metals) to light", Phil. Trans. R. Soc. Lond. 1857, 38 pages.
Garcia, G., et al., "Dynamically Modulating the Surface Plasmon Resonance of Doped Semiconductor Nanocrystals", NANO Letters, 2011, 11, pp. 4415-4420.
Gross, B. C., et al., "Evaluation of 3D Printing and its Potential Impact on Biotachnology and the Chemical Sciences", Anal. Chem., 2014, 86, pp. 3240-3253.
Usui, H., et al., "Optical Transmittance of Indium Tin Oxide Nanoparticles Prepared by Laser-Induced Fragmentation in Water", J. Phys. Cham. B 2006, 110, pp. 12890-12895.
Kanehara, M, et al "Indium Tin Oxide Nanoparticies with Compositionally Tunable Surface Plasmon Resonance Frequencies in the Near-IR Region" J. Am Chem Soc 2009,131, 17736-37.
'Weiser, H. B., et al., "Von Weimarn's Precipitation Theory and the Formation of Colloidal Gold", The Rice Institute, 1931, 10 pages.
Van Der Zande, B. M. I., et al, "Aqueous Gold Sols of Rod-Shaped Particles", J. Phys. Chem. B 1997, 101, pp. 852-854.

* cited by examiner

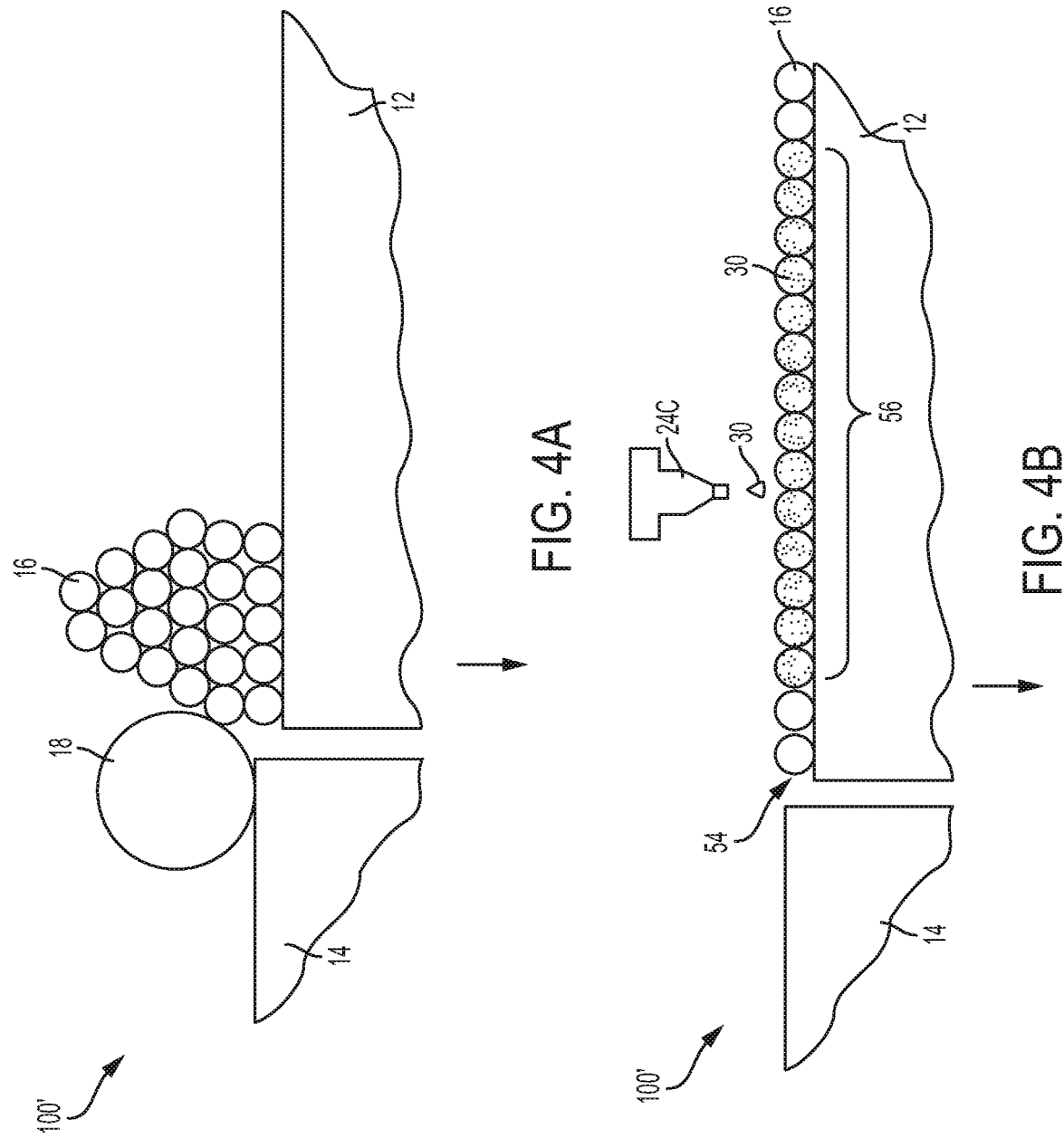

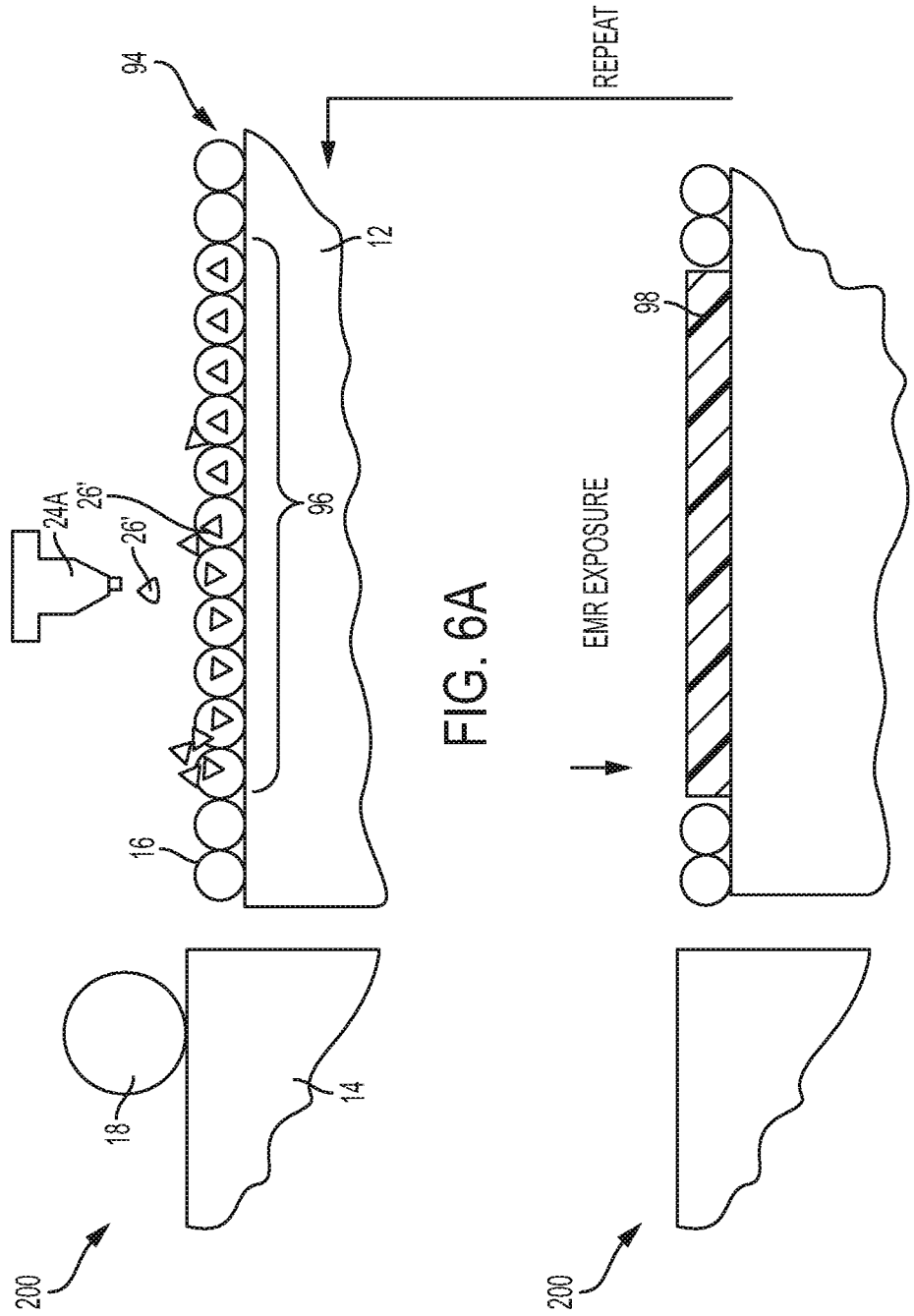

THREE-DIMENSIONAL (3D) PRINTING

CROSS-REFERENCE TO RELATED APPLICATIONS

This application is a continuation of co-pending international application S.N. PCT/US2016/058684, filed Oct. 25, 2016, which is incorporated by reference herein.

BACKGROUND

Three-dimensional (3D) printing may be an additive printing process used to make three-dimensional solid parts from a digital model. 3D printing is often used in rapid product prototyping, mold generation, and mold master generation. Some 3D printing techniques are considered additive processes because they involve the application of successive layers of material. This is unlike traditional machining processes, which often rely upon the removal of material to create the final part. Materials used in 3D printing often require curing or fusing, which for some materials may be accomplished using heat-assisted extrusion or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 4A through 4H are schematic views depicting the formation of a part using an example of the 3D printing method disclosed herein;

FIGS. 6A through 6D are schematic views depicting the formation of a part using another example of the 3D printing method disclosed herein.

DETAILED DESCRIPTION

Figure 1:
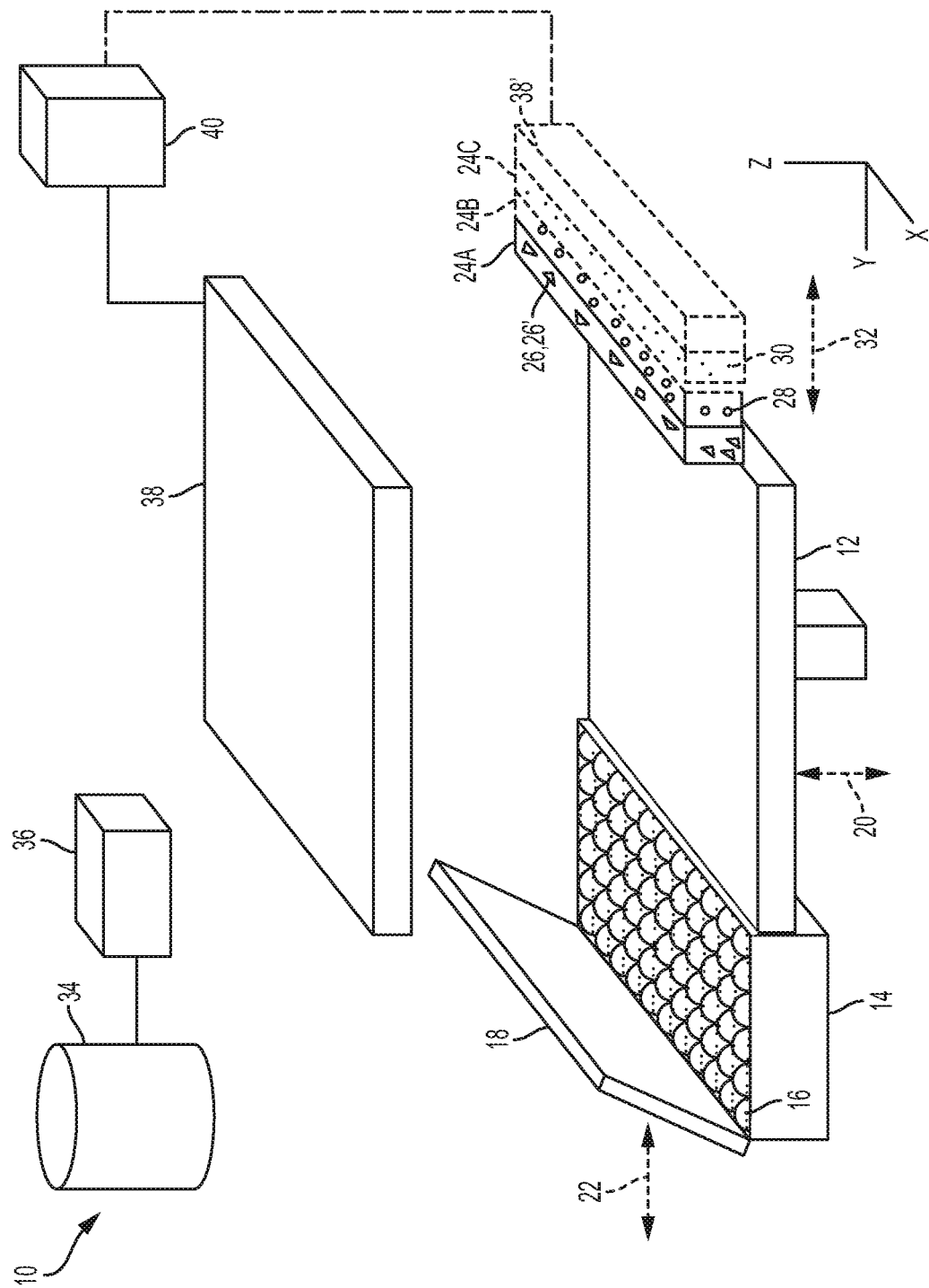
FIG. 1 is a simplified isometric view of an example 3D printing system.

Examples of the three-dimensional (3D) printing method and the 3D printing system disclosed herein utilize Multi Jet Fusion (MJF). During multi jet fusion, an entire layer of a build material (also referred to as build material particles) is exposed to radiation, but a selected region (in some instances less than the entire layer) of the build material is fused and hardened to become a layer of a 3D part. A fusing agent is selectively deposited in contact with the selected region of the build material. The fusing agent(s) is capable of penetrating into the layer of the build material and spreading onto the exterior surface of the build material. This fusing agent is capable of absorbing radiation and converting the absorbed radiation to thermal energy, which in turn melts or sinters the build material that is in contact with the core fusing agent. This causes the build material to fuse, bind, cure, etc. to form the layer of the 3D part.

The fusing agents used in multi jet fusion tend to have significant absorption (e.g., 80%) in the visible region (400 nm-780 nm). In the examples disclosed herein, this fusing agent is referred to as the core fusing agent, or, in some instances, the black fusing agent. This absorption generates heat suitable for fusing during 3D printing, which leads to 3D parts having mechanical integrity and relatively uniform mechanical properties (e.g., strength, elongation at break, etc.). This absorption, however, also results in strongly colored, e.g., black, 3D parts.

Some examples of the method and system disclosed herein utilize an example of a low tint fusing agent (also referred to herein as "fusing agent" and "primer fusing agent") instead of the core fusing agent to build the entire 3D part. This example of the low tint fusing agent includes stabilized cesium tungsten oxide (CTO) nanoparticles. The CTO nanoparticles are a plasmonic resonance absorber, having absorption at wavelengths ranging from 800 nm to 4000 nm and transparency at wavelengths ranging from 400 nm to 780 nm. As used herein "absorption" means that at least 80% of radiation having wavelengths ranging from 800 nm to 4000 nm is absorbed. Also used herein, "transparency" means that 20% or less of radiation having wavelengths ranging from 400 nm to 780 nm is absorbed. This absorption and transparency allows the low tint fusing agent to absorb enough radiation to fuse the build material in contact therewith while causing the 3D part to be white or slightly colored.

Other examples of the method and system disclosed herein utilize a combination of different fusing agents (e.g., the core fusing agent and the low tint fusing agent mentioned above or another low tint fusing agent) to build a part having a core (innermost layers or region) with mechanical integrity and having an exterior (outermost layers or region) with color (i.e., white or some color other than black). The agent(s) that are applied will depend upon whether the layer or portion of the layer is to enhance mechanical properties or to be color focused.

Referring now to FIG. 1, an example of a 3D printing system 10 is depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The printing system 10 includes a build area platform 12, a build material supply 14 containing build material particles 16, and a build material distributor 18.

The build area platform 12 receives the build material particles 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

Figure 4C:
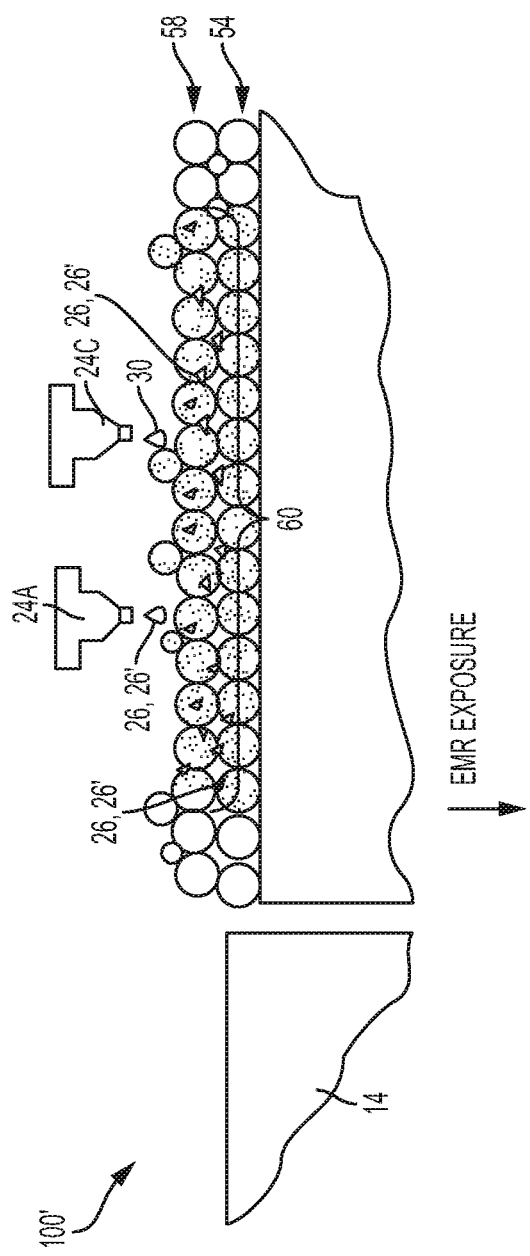
Figure 4D:
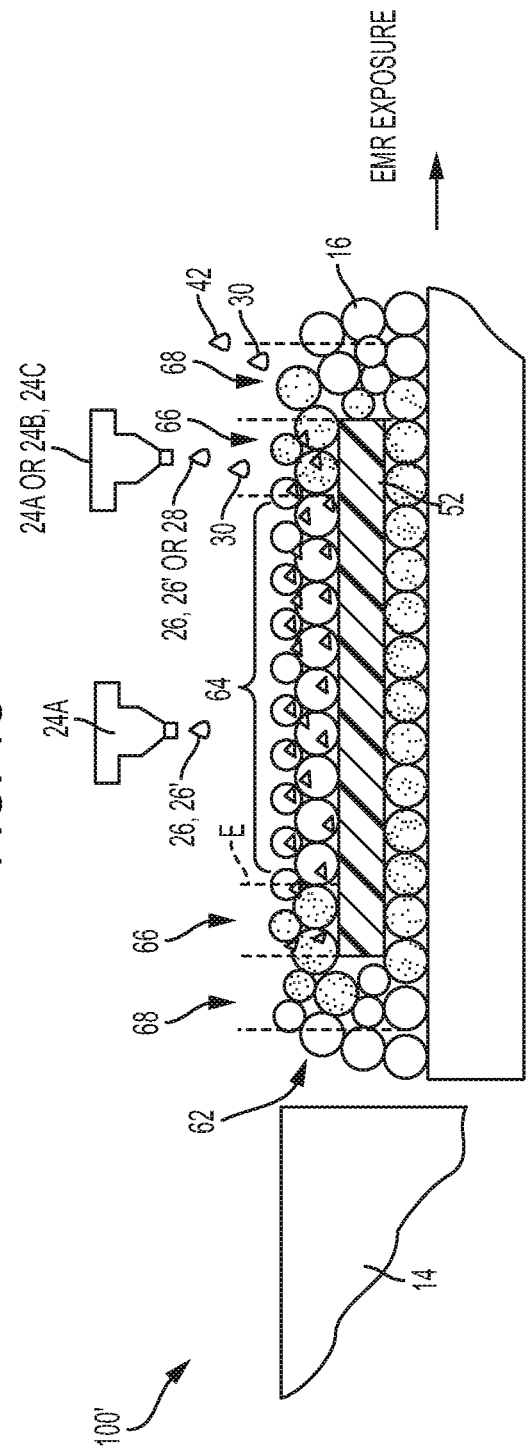

The build area platform 12 may be moved in a direction as denoted by the arrow 20, e.g., along the z-axis, so that build material particles 16 may be delivered to the platform 12 or to a previously formed part layer (see, e.g., FIG. 4D). In an example, when the build material particles 16 are to be delivered, the build area platform 12 may be programmed to advance (e.g., downward) enough so that the build material distributor 18 can push the build material particles 16 onto the platform 12 to form a substantially uniform layer of the build material particles 16 thereon (see, e.g., FIGS. 4A and 6A). The build area platform 12 may also be returned to its original position, for example, when a new part is to be built.

The build material supply 14 may be a container, bed, or other surface that is to position the build material particles 16 between the build material distributor 18 and the build area platform 12. In some examples, the build material supply 14 may include a surface upon which the build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material particles 16 from a storage location to a position to be spread onto the build area platform 12 or onto a previously formed part layer.

The build material distributor 18 may be moved in a direction as denoted by the arrow 22, e.g., along the y-axis, over the build material supply 14 and across the build area platform 12 to spread a layer of the build material particles 16 over the build area platform 12. The build material distributor 18 may also be returned to a position adjacent to the build material supply 14 following the spreading of the build material particles 16. The build material distributor 18 may be a blade (e.g., a doctor blade), a roller, a combination of a roller and a blade, and/or any other device capable of spreading the build material particles 16 over the build area platform 12. For instance, the build material distributor 18 may be a counter-rotating roller.

The build material particles 16 may be a polymeric build material. As used herein, the term "polymeric build material" may refer to crystalline or semi-crystalline polymer particles or composite particles made up of polymer and ceramic. Any of the particles 16 may be in powder form. Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other examples of crystalline or semi-crystalline polymers suitable for use as the build material particles 16 include polyethylene, polypropylene, and polyoxymethylene (i.e., polyacetals). Still other examples of suitable build material particles 16 include polystyrene, polycarbonate, polyester, polyurethanes, other engineering plastics, and blends of any two or more of the polymers listed herein.

Any of the previously listed crystalline or semi-crystalline polymer particles may be combined with ceramic particles to form the composite particles. Examples of suitable ceramic particles include metal oxides, inorganic glasses, carbides, nitrides, and borides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. The amount of ceramic particles that may be combined with the crystalline or semi-crystalline polymer particles may depend on the materials used and the 3D part to be formed. In one example, the ceramic particles may be present in an amount ranging from about 1 wt % to about 20 wt % based on the total wt % of the build material particles 16.

The build material particles 16 may have a melting point or softening point ranging from about 50° C. to about 400° C. As an example, the build material particles 16 may be a polyamide having a melting point of 180° C.

The build material particles 16 may be made up of similarly sized particles or differently sized particles. The term "size", as used herein with regard to the build material particles 16, refers to the diameter of a spherical particle, or the average diameter of a non-spherical particle (i.e., the average of multiple diameters across the particle), or the volume-weighted mean diameter of a particle distribution. In an example, the average size of the build material particles 16 ranges from 5 µm to about 200 µm.

As shown in FIG. 1, the printing system 10 also includes an inkjet applicator 24A, which may contain examples of the fusing agent 26 or 26' (i.e., the low tint or primer fusing agent).

The fusing agents 26, 26' generally include an aqueous or non-aqueous vehicle and a plasmonic resonance absorber dispersed therein. The fusing agent 26' is one specific example of the low tint or primer fusing agent, which includes CTO nanoparticles as the plasmonic resonance absorber, a zwitterionic stabilizer, and an aqueous vehicle.

As mentioned above, the fusing agent 26 includes the plasmonic resonance absorber. The plasmonic resonance absorber allows the fusing agent 26 to absorb radiation at wavelengths ranging from 800 nm to 4000 nm, which enables the fusing agent 26 to convert enough radiation to thermal energy so that the build material particles 16 fuse. The plasmonic resonance absorber also allows the fusing agent 26 to have transparency at wavelengths ranging from 400 nm to 780 nm, which enables the 3D part 38 to be white or slightly colored.

The absorption of the plasmonic resonance absorber is the result of the plasmonic resonance effects. Electrons associated with the atoms of the plasmonic resonance absorber may be collectively excited by electromagnetic radiation, which results in collective oscillation of the electrons. The wavelengths required to excite and oscillate these electrons collectively are dependent on the number of electrons present in the plasmonic resonance absorber particles, which in turn is dependent on the size of the plasmonic resonance absorber particles. The amount of energy required to collectively oscillate the particle's electrons is low enough that very small particles (e.g., 1-100 nm) may absorb electromagnetic radiation with wavelengths several times (e.g., from 8 to 800 or more times) the size of the particles. The use of these particles allows the fusing agent 26 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3:SnO_2$, ITO), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO_4$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the plasmonic resonance absorber that is present in the fusing agent 26 ranges from about 1.0 wt % to about 20.0 wt % based on the total wt % of the fusing agent 26. In some examples, the amount of the plasmonic resonance absorber present in the fusing agent 26 ranges from about 1.0 wt % up to about 10.0 wt %. In other examples, the amount of the plasmonic resonance absorber present in the fusing agent 26 ranges from greater than 4.0 wt % up to about 15.0 wt %. It is believed that these plasmonic resonance absorber loadings provide a balance between the fusing agent 26 having jetting reliability and electromagnetic radiation absorbance efficiency.

As used herein, "FA vehicle" may refer to the liquid fluid in which the plasmonic resonance absorber is placed to form the fusing agent 26. A wide variety of FA vehicles, including aqueous and non-aqueous vehicles, may be used with the plasmonic resonance absorber. In some instances, the FA vehicle includes water alone or a non-aqueous solvent (e.g. dimethyl sulfoxide (DMSO), ethanol, etc.) alone. In other instances, the FA vehicle may further include a dispersing additive, a surfactant, a co-solvent, a biocide (i.e., antimicrobial), an anti-kogation agent, a silane coupling agent, a chelating agent, and combinations thereof.

When the FA vehicle is water-based, the aqueous nature of the fusing agent 26 enables the fusing agent 26 to penetrate, at least partially, into the layer of the build material particles 16. The build material particles 16 may be hydrophobic, and the presence of the co-solvent, the surfactant, and/or the dispersing additive in the fusing agent 26 when the fusing agent 26 is water-based or non-aqueous based may assist in obtaining a particular wetting behavior.

The plasmonic resonance absorber in the fusing agent 26 may, in some instances, be dispersed with a dispersing additive. As such, the dispersing additive helps to uniformly distribute the plasmonic resonance absorber throughout the fusing agent 26. As mentioned above, the dispersing additive may also aid in the wetting of the fusing agent 26 onto the build material particles 16. Some examples of the dispersing additive include a water soluble acrylic acid polymer (e.g., CARBOSPERSE® K7028 available from Lubrizol), a styrene-acrylic pigment dispersion resin (e.g., JONCRYL® 671 available from BASF Corp.), a high molecular weight block copolymer with pigment affinic groups (e.g., DISPER-BYK®-190 available BYK Additives and Instruments), and combinations thereof. Whether a single dispersing additive is used or a combination of dispersing additives is used, the total amount of dispersing additive(s) in the fusing agent 26 may range from about 10 wt % to about 200 wt % based on the wt % of the plasmonic resonance absorber in the fusing agent 26.

Surfactant(s) may also be used in the FA vehicle to improve the wetting properties of the fusing agent 26. Examples of suitable surfactants include non-ionic surfactants. Some specific examples include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15S7, and TERGITOL™ 15S9 from The Dow Chemical Company). In some examples, an anionic surfactant may be used in combination with the non-ionic surfactant. One suitable anionic surfactant is an alkyldiphenyloxide disulfonate (e.g., DOWFAX™ 8390 and DOWFAX™ 2A1 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the fusing agent 26 may range from about 0.1 wt % to about 4 wt % based on the total wt % of the fusing agent 26.

Some examples of the co-solvent that may be added to the FA vehicle include 1-(2-hydroxyethyl)-2-pyrollidinone, 2-pyrrolidinone, 1,5-pentanediol, triethylene glycol, tetraethylene glycol, 2-methyl-1,3-propanediol, 1,6-hexanediol, tripropylene glycol methyl ether, and combinations thereof. Whether a single co-solvent is used or a combination of co-solvents is used, the total amount of co-solvent(s) in the fusing agent 26 may range from about 2 wt % to about 80 wt % with respect to the total wt % of the fusing agent 26.

A biocide or antimicrobial may be added to the fusing agent 26. Examples of suitable biocides include an aqueous solution of 1,2-benzisothiazolin-3-one, quaternary ammonium compounds (e.g., BARDAC® 2250 and 2280, BARQUAT® 50-65B, and CARBOQUAT® 250-T, all from Lonza Ltd. Corp.), an aqueous solution of methylisothiazolone, NUOSEPT® (Ashland Inc.), VANCIDE® (R.T. Vanderbilt Co.), ACTICIDE® B20 and ACTICIDE® M20 (Thor Chemicals). Whether a single biocide is used or a combination of biocides is used, the total amount of biocide(s) in the fusing agent 26 may range from about 0.1 wt % to about 1 wt % with respect to the total wt % of the fusing agent 26.

An anti-kogation agent may be included in the fusing agent 26. Kogation refers to the deposit of dried ink (e.g., fusing agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) acrylic acid polymer (e.g., commercially available as CARBOS- PERSE™ K-7028 Polyacrylate from Lubrizol). Whether a single anti-kogation agent is used or a combination of anti-kogation agents is used, the total amount of anti-kogation agent(s) in the fusing agent 26 may range from about 0.1 wt % to about 0.2 wt % based on the total wt % of the fusing agent 26.

A silane coupling agent may be added to the fusing agent 26 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent 26 may range from about 0.1 wt % to about 50 wt % based on the wt % of the plasmonic resonance absorber in the fusing agent 26. In an example, the total amount of silane coupling agent(s) in the fusing agent 26 ranges from about 1 wt % to about 30 wt % based on the wt % of the plasmonic resonance absorber. In another example, the total amount of silane coupling agent(s) in the fusing agent 26 ranges from about 2.5 wt % to about 25 wt % based on the wt % of the plasmonic resonance absorber.

The fusing agent 26 may also include other additives, such as a chelating agent. The chelating agent may be included to eliminate the deleterious effects of heavy metal impurities. Examples of suitable chelating agents include disodium ethylenediaminetetraacetic acid (EDTA-Na), ethylene diamine tetra acetic acid (EDTA), and methylglycinediacetic acid (e.g., TRILON® M from BASF Corp.). Whether a single chelating agent is used or a combination of chelating agents is used, the total amount of chelating agent(s) in the fusing agent 26 may range from 0 wt % to about 2 wt % based on the total wt % of the fusing agent 26. Still another suitable additive for the fusing agent 26 is a humectant and lubricant (e.g., LIPONIC® EG-1 (LEG-1) from Lipo Chemicals).

The balance of the fusing agent 26 is water or the non-aqueous solvent.

As mentioned above, the fusing agent 26' is a specific example of the low tint or primer fusing agent. The fusing agent 26' includes CTO nanoparticles as the plasmonic resonance absorber, a zwitterionic stabilizer, and an aqueous vehicle.

The CTO nanoparticles in the fusing agent 26' have a general formula of $Cs_xWO_3$, where $0<x<1$. The cesium tungsten oxide nanoparticles may give the fusing agent 26' a light blue color. The strength of the color may depend, at least in part, on the amount of the CTO nanoparticles in the fusing agent 26'. When it is desirable to form an outer white layer on the 3D part, less of the CTO nanoparticles may be used in the fusing agent 26' in order to achieve the white color. In an example, the CTO nanoparticles may be present in the fusing agent 26' in an amount ranging from about 1 wt % to about 20 wt % (based on the total wt % of the fusing agent 26').

The average particle size (e.g., volume-weighted mean diameter) of the CTO nanoparticles may range from about 1 nm to about 40 nm. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

The fusing agent 26' also includes the zwitterionic stabilizer. The zwitterionic stabilizer may improve the stabilization of the fusing agent 26'. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the fusing agent 26'.

Examples of suitable zwitterionic stabilizers include C2 to C8 betaines, C2 to C8 aminocarboxylic acids having a solubility of at least 10 g in 100 g of water, taurine, and combinations thereof. Examples of the C2 to C8 aminocarboxylic acids include beta-alanine, gamma-aminobutyric acid, glycine, and combinations thereof.

The zwitterionic stabilizer may be present in the fusing agent 26' in an amount ranging from about 2 wt % to about 35 wt % (based on the total wt % of the fusing agent 26'). When the zwitterionic stabilizer is the C2 to C8 betaine, the C2 to C8 betaine may be present in an amount ranging from about 8 wt % to about 35 wt % of a total wt % of fusing agent 26'. When the zwitterionic stabilizer is the C2 to C8 aminocarboxylic acid, the C2 to C8 aminocarboxylic acid may be present in an amount ranging from about 2 wt % to about 20 wt % of a total wt % of fusing agent 26'. When the zwitterionic stabilizer is taurine, taurine may be present in an amount ranging from about 2 wt % to about 35 wt % of a total wt % of fusing agent 26'.

In an example, the weight ratio of the CTO nanoparticles to the zwitterionic stabilizer ranges from 1:10 to 10:1. In another example, the weight ratio of the CTO nanoparticles to the zwitterionic stabilizer is 1:1.

In one example, the fusing agent 26' also includes an aqueous vehicle, which includes a surfactant and a balance of water. In another example, the aqueous vehicle of the fusing agent 26' includes a co-solvent, a surfactant, and a balance of water. Any of the co-solvents and/or surfactants previously described for the fusing agent 26 may be used in the fusing agent 26' in the respective amounts previously described, except the wt % is respect to the total wt % of the fusing agent 26'. The fusing agent 26' may also include a humectant and lubricant.

In some examples, the fusing agent 26' may also include an additive selected from the group consisting of an anti-kogation agent, a chelating agent, a biocide, or a combination thereof. Any of the anti-kogation agents, chelating agents, and/or biocides previously described for the fusing agent 26 may be used in the fusing agent 26'. While the amount of the additive may vary depending upon the type of additive, generally the additive may be present in the fusing agent 26' in an amount ranging from about 0.01 wt % to about 20 wt % (based on the total wt % of the fusing agent 26'). As specific examples, the respective amounts of the anti-kogation agents, chelating agents, and/or biocides previously described for the fusing agent 26 may be used in the fusing agent 26', except the wt % is respect to the total wt % of the fusing agent 26'.

In some examples disclosed herein, the fusing agent 26' may also include additional dispersant(s) (e.g., a low molecular weight (e.g., <5,000) polyacrylic acid polymer, such as CARBOSPERSE™ K-7028 Polyacrylate from Lubrizol), preservative(s), jettability additive(s), and the like.

It is to be understood that the CTO nanoparticles may be added to the other components (including the zwitterionic stabilizer) to form the fusing agent 26'. In another example, the CTO nanoparticles may be present in a cesium tungsten oxide nanoparticle dispersion (including the zwitterionic stabilizer), which is a separate dispersion that is added to the other components to form the fusing agent 26'.

As depicted in FIG. 1, some examples of the printing system 10 may include at least one additional inkjet applicator 24B and/or 24C. In one example, the printing system 10 includes inkjet applicator 24B, which may contain a core fusing agent 28, in addition to the inkjet applicator 24A. In another example, the printing system 10 includes inkjet applicator 24C, which may contain a colored inkjet ink 30, in addition to the inkjet applicator 24A. In still another example, the printing system 10 includes both inkjet applicators 24B and 24C in addition to the inkjet applicator 24A.

Examples of the core fusing agent 28 are water-based dispersions including a radiation absorbing agent (i.e., an active material). The amount of the active material in the core fusing agent 28 may depend upon how absorbing the active material is. In an example, the core fusing agent 28 may include the active material and may be applied in an amount sufficient to include at least 0.01 wt % of the active material in the 3D part layer that is formed with the core fusing agent 28. Even this low amount can produce a black colored part layer.

The active material in the core fusing agent 28 may be any infrared light absorbing colorant that is black. As such, the core fusing agent 28 may be referred to herein as the black fusing agent 28. In an example, the active material is a near infrared light absorber. Any near infrared black colorants produced by Fabricolor, Eastman Kodak, or Yamamoto may be used in the core fusing agent 28.

As one example, the core fusing agent 28 may be an ink formulation including carbon black as the active material. Examples of this ink formulation are commercially known as CM997A, 516458, C18928, C93848, C93808, or the like, all of which are available from HP Inc. As another example, the core fusing agent 28 may be an ink formulation including near infrared absorbing dyes as the active material.

The core fusing agent 28 is an aqueous formulation (i.e., includes a balance of water) that may also include any of the previously listed co-solvent(s), non-ionic surfactant(s), biocide(s), and/or anti-kogation agent(s). In an example of the core fusing agent 28, the co-solvent(s) is/are present in an amount ranging from about 1 wt % to about 60 wt % of the total wt % of the agent 28, the non-ionic surfactant(s) is/are present in an amount ranging from about 0.5 wt. % to about 1.5 wt. % based on the total wt. % of the agent 28, the biocide(s) is/are present in an amount ranging from about 0.1 wt. % to about 5 wt. % based on the total wt. % of the agent 28, and/or the anti-kogation agent(s) is/are present in an amount ranging from about 0.1 wt. % to about 5 wt. % based on the total wt. % of the agent 28.

Some examples of the core fusing agent 28 may also include a pH adjuster, which is used to control the pH of the agent 28. From 0 wt % to about 2 wt % (of the total wt % of the core fusing agent 28) of the pH adjuster, for example, can be used.

The colored inkjet ink 30 includes a colorant, a dispersant/dispersing additive, a co-solvent, and water. In some instances, the colored inkjet ink 30 includes these components and no other components. In other instances, the colored inkjet ink 30 may further include an anti-kogation agent, a biocide, a binder, and combinations thereof.

The colorant of the colored inkjet ink 30 is a pigment and/or dye having a color other than white. Examples of the other colors include cyan, magenta, yellow, black, etc. In some instances, the colorant of the colored ink 34 may also be transparent to infrared wavelengths. Examples of IR transparent colorants include acid yellow 23 (AY 23), AY17, acid red 52 (AR 52), AR 289, and reactive red 180 (RR 180). In other instances, the colorant of the colored inkjet ink 30 may not be completely transparent to infrared wavelengths, but does not absorb enough radiation to sufficiently heat the build material particles in contact therewith. For example, the colorant of the colored inkjet ink 30 may absorb some visible wavelengths and some IR wavelengths. Some examples of these colorants include cyan colorants, such as direct blue 199 (DB 199) and pigment blue 15:3 (PB 15:3).

The colored inkjet ink 30 also includes the dispersing additive, which helps to uniformly distribute the colorant throughout the colored inkjet ink 30 and aid in the wetting of the ink 30 onto the build material particles 16. Any of the dispersing additives discussed herein for the fusing agent 26 may be used in the colored inkjet ink 30. The dispersing additive may be present in the colored inkjet ink 30 in a similar amount as the colorant.

In addition to the non-white colorant and the dispersing additives, the colored inkjet ink 30 may include similar components as the fusing agent 26 (e.g., co-solvent(s), anti-kogation agent(s), biocide(s), water, etc.). The colored inkjet ink 30 may also include a binder, such as an acrylic latex binder, which may be a copolymer of any two or more of styrene, acrylic acid, methacrylic acid, methyl methacrylate, ethyl methacrylate, and butyl methacrylate. Some examples of the colored inkjet ink 30 may also include other additives, such as a humectant and lubricant (e.g., LIPONIC® EG-1 (LEG-1) from Lipo Chemicals), a chelating agent (e.g., disodium ethylenediaminetetraacetic acid (EDTA-Na)), and/or a buffer.

An example of the pigment based colored inkjet ink 30 may include from about 1 wt % to about 10 wt % of pigment(s), from about 10 wt % to about 30 wt % of co-solvent(s), from about 1 wt % to about 10 wt % of dispersing additive(s), from 0.01 wt % to about 1 wt % of anti-kogation agent(s), from about 0.1 wt % to about 5 wt % of binder(s), from about 0.05 wt % to about 0.1 wt % biocide(s), and a balance of water. An example of the dye based colored inkjet ink 30 may include from about 1 wt % to about 7 wt % of dye(s), from about 10 wt % to about 30 wt % of co-solvent(s), from about 1 wt % to about 7 wt % of dispersing additive(s), from 0.05 wt % to about 0.1 wt % of chelating agent(s), from about 0.005 wt % to about 0.2 wt % of buffer(s), from about 0.05 wt % to about 0.1 wt % biocide(s), and a balance of water.

Some examples of the colored inkjet ink 30 include a set of cyan, magenta, and yellow inks, such as C1893A (cyan), C1984A (magenta), and C1985A (yellow); or C4801A (cyan), C4802A (magenta), and C4803A (yellow); all of which are available from Hewlett-Packard Company. Other commercially available colored inks include C9384A (printhead HP 72), C9383A (printhead HP 72), C4901A (printhead HP 940), and C4900A (printhead HP 940).

The inkjet applicator(s) 24A, 24B, 24C may be scanned across the build area platform 12 in the direction indicated by the arrow 32, e.g., along the y-axis. The inkjet applicator(s) 24A, 24B, 24C may be, for instance, a thermal inkjet printhead, a piezoelectric printhead, etc., and may extend a width of the build area platform 12. While each of the inkjet applicator(s) 24A, 24B, 24C is shown in FIG. 1 as a single applicator, it is to be understood that each of the inkjet applicator(s) 24A, 24B, 24C may include multiple inkjet applicators that span the width of the build area platform 12. Additionally, the inkjet applicator(s) 24A, 24B, 24C may be positioned in multiple printbars. The inkjet applicator(s) 24A, 24B, 24C may also be scanned along the x-axis, for instance, in configurations in which the inkjet applicator(s) 24A, 24B, 24C does/do not span the width of the build area platform 12 to enable the inkjet applicator(s) 24A, 24B, 24C to respectively deposit the fusing agent 26 or 26', the core fusing agent 28, and the colored inkjet ink 30 over a large area of a layer of build material particles 16. The inkjet applicator(s) 24A, 24B, 24C may thus be attached to a moving XY stage or a translational carriage (neither of which is shown) that moves the inkjet applicator(s) 24A, 24B, 24C adjacent to the build area platform 12 in order to deposit the respective fluids 26 or 26', 28, and 30 in predetermined areas of a layer of the build material particles 16 that has been formed on the build area platform 12 in accordance with the method(s) disclosed herein. The inkjet applicator(s) 24A, 24B, 24C may include a plurality of nozzles (not shown) through which the fluids 26 or 26', 28, and 30 are to be respectively ejected.

Figure 4E:
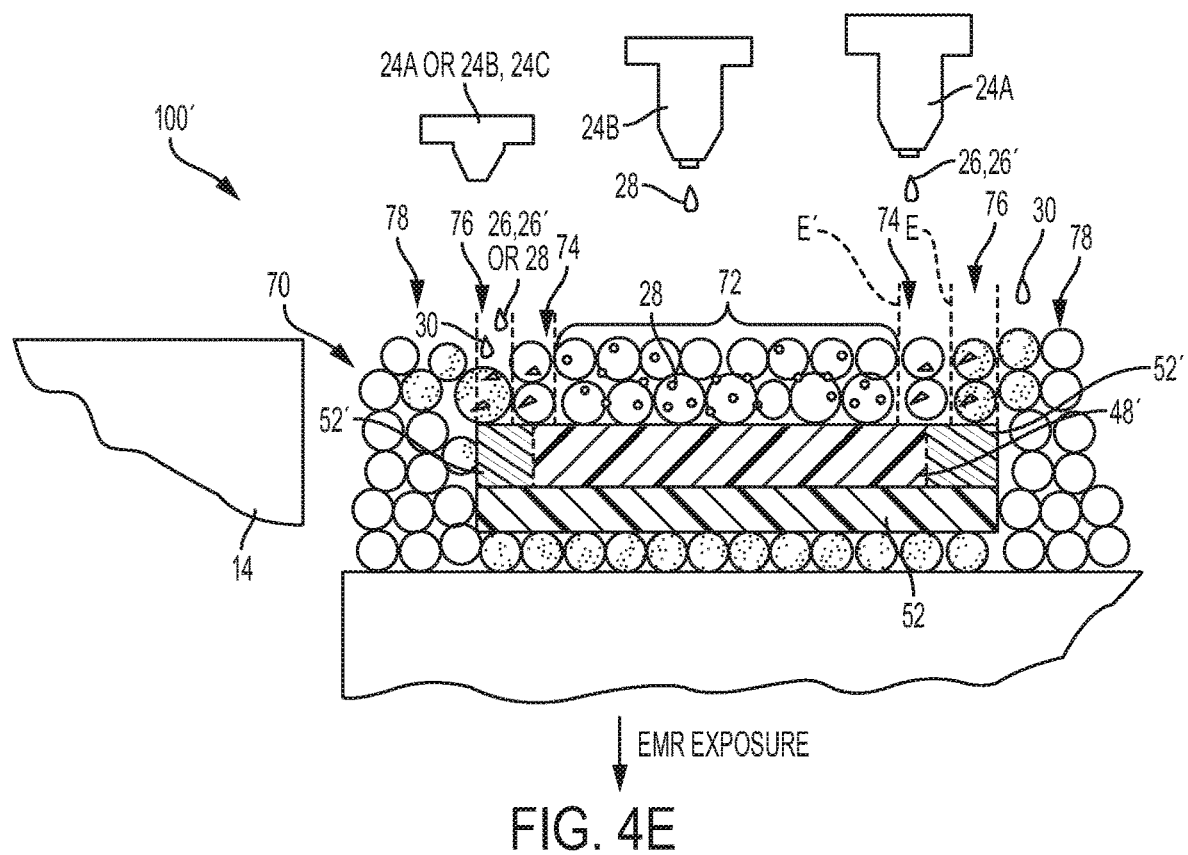
Figure 4F:
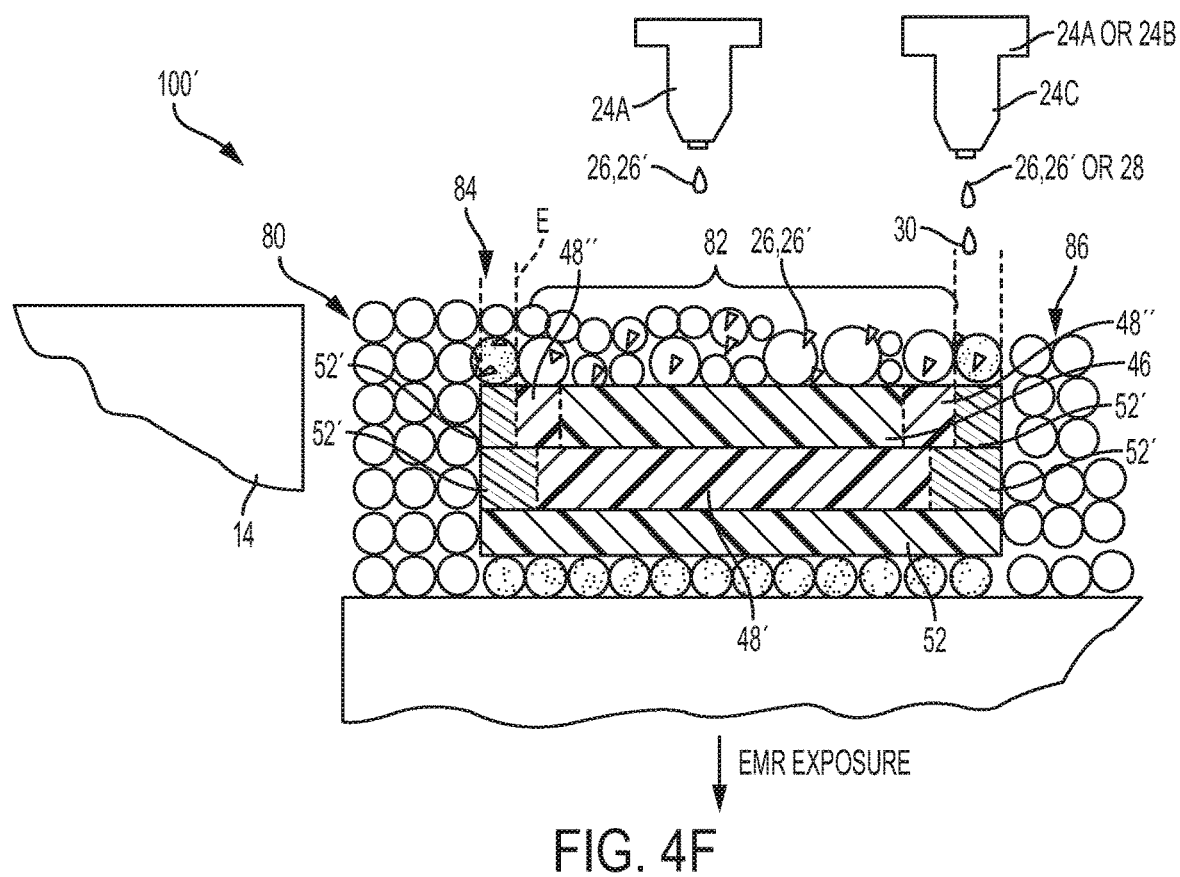
Figure 4G:
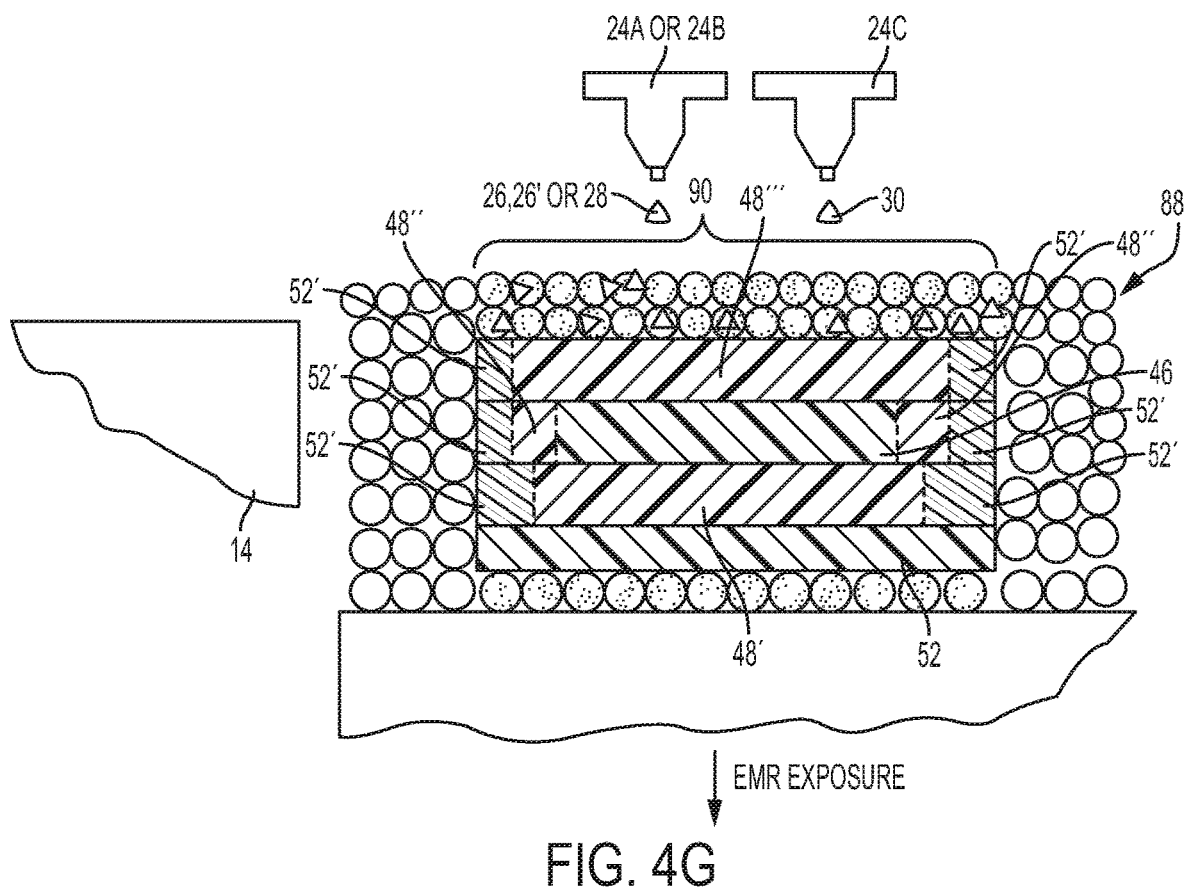
Figure 4H:
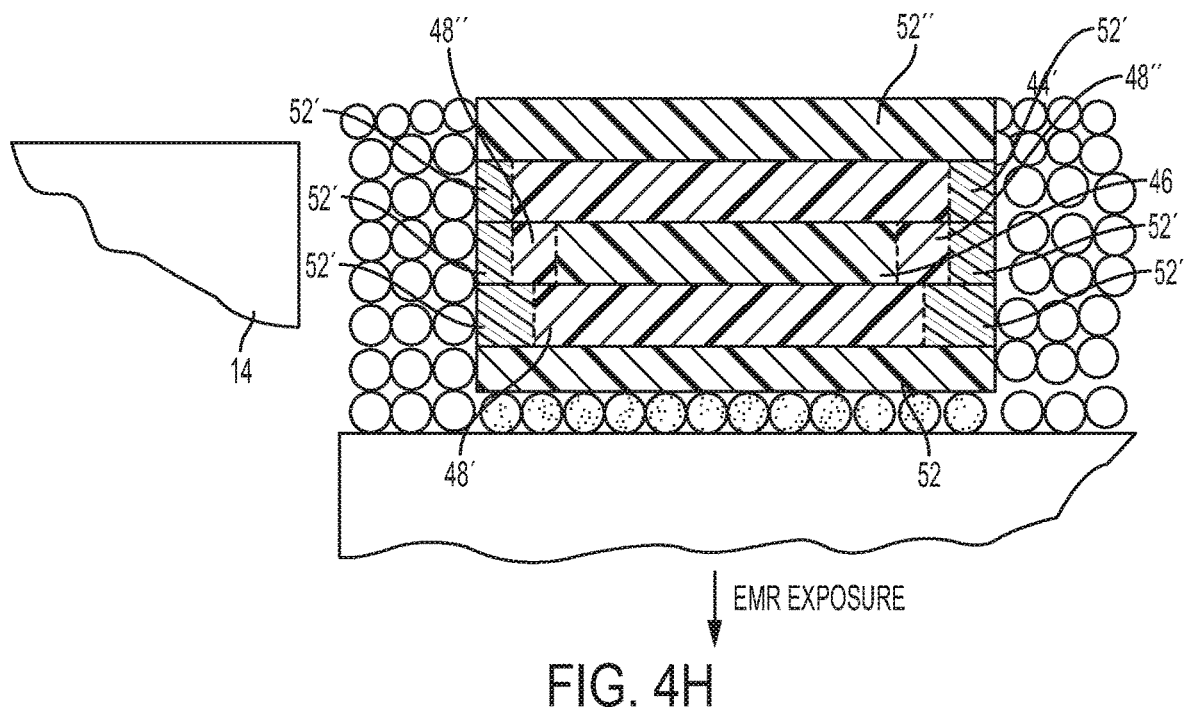

While not shown in FIG. 1, the printing system 10 may also include another inkjet applicator (not shown), which may contain a detailing agent (42, see FIG. 4H). This other inkjet applicator is similar to inkjet applicators 24A, 24B, 24C and may be configured in any manner described herein in reference to inkjet applicators 24A, 24B, 24C.

The detailing agent 42 may be used for thermal management of build material particles 16 that are not to be fused. The detailing agent 42 may be water alone. The detailing agent 42 may also include a surfactant and/or a co-solvent. In some examples, the detailing agent 42 consists of these components, and no other components. In other examples, the detailing agent 42 further includes an anti-kogation agent, a biocide, or combinations thereof. The components of the detailing agent 34 may be similar to the surfactants, co-solvents, anti-kogation agents, and biocide described herein in reference to the fusing agent 26, 26' and/or the core fusing agent 28.

The inkjet applicators 24A, 24B, 24C may respectively deliver drops of the fusing agent 26 or 26', the core fusing agent 28, and the colored inkjet ink 30 (or the detailing agent 42) at a resolution ranging from about 300 dots per inch (DPI) to about 1200 DPI. In other examples, the applicator(s) 24A, 24B, 24C may deliver drops of the respective fluids 26 or 26', 28, and 30 at a higher or lower resolution. The drop velocity may range from about 5 m/s to about 24 m/s and the firing frequency may range from about 1 kHz to about 100 kHz. In one example, each drop may be in the order of about 10 picoliters (pl) per drop, although it is contemplated that a higher or lower drop size may be used. In some examples, inkjet applicators 24A, 24B, 24C are able to deliver variable size drops of the fluids 26 or 26', 28, and 30, respectively.

Each of the previously described physical elements may be operatively connected to a controller 34 of the printing system 10. The controller 34 may control the operations of the build area platform 12, the build material supply 14, the build material distributor 18, and the inkjet applicator(s) 24A, 24B, 24C. As an example, the controller 34 may control actuators (not shown) to control various operations of the 3D printing system 10 components. The controller 34 may be a computing device, a semiconductor-based microprocessor, a central processing unit (CPU), an application specific integrated circuit (ASIC), and/or another hardware device. Although not shown, the controller 34 may be connected to the 3D printing system 10 components via communication lines.

The controller 34 manipulates and transforms data, which may be represented as physical (electronic) quantities within the printer's registers and memories, in order to control the physical elements to create the 3D part. As such, the controller 34 is depicted as being in communication with a data store 36. The data store 36 may include data pertaining to a 3D part to be printed by the 3D printing system 10. The data for the selective delivery of the build material particles 16, the fusing agent 26 or 26', the core fusing agent 28, the colored inkjet ink 30, etc. may be derived from a model of the 3D part to be formed. For instance, the data may include the locations on each layer of build material particles 16 that the inkjet applicator(s) 24A, 24B, 24C are to deposit the fusing agent 26 or 26', the core fusing agent 28, the colored inkjet ink 30, and/or the detailing agent 42. In one example, the controller 34 may use the data to control the inkjet applicator 24A to selectively apply the fusing agent 26 or 26'. The data store 36 may also include machine readable instructions (stored on a non-transitory computer readable medium) that are to cause the controller 34 to control the amount of build material particles 16 that is supplied by the build material supply 14, the movement of the build area platform 12, the movement of the build material distributor 18, the movement of the inkjet applicator(s) 24A, 24B, 24C, etc.

As shown in FIG. 1, the printing system 10 may also include a radiation source 38, 38'. In some examples, the radiation source 38 may be in a fixed position with respect to the build material platform 12. In other examples, the radiation source 38' may be positioned to expose the layer of build material particles 16 to radiation immediately after the fusing agent 26, 26' and/or the core fusing agent 28 has been applied thereto. In the example shown in FIG. 1, the radiation source 38' is attached to the side of the inkjet applicator(s) 24A, 24B, 24C, which allows for patterning and heating in a single pass.

The radiation source 38, 38' may emit electromagnetic radiation having wavelengths ranging from about 800 nm to about 1 mm. As one example, the electromagnetic radiation may range from about 800 nm to about 2 μm. As another example, the electromagnetic radiation may be blackbody radiation with a maximum intensity at a wavelength of about 1100 nm. The radiation source 38, 38' may be infrared (IR) or near-infrared light sources, such as IR or near-IR curing lamps, IR or near-IR light emitting diodes (LED), or lasers with the desirable IR or near-IR electromagnetic wavelengths.

The radiation source 38, 38' may be operatively connected to a lamp/laser driver, an input/output temperature controller, and temperature sensors, which are collectively shown as radiation system components 40. The radiation system components 40 may operate together to control the r radiation source 38, 38'. The temperature recipe (e.g., radiation exposure rate) may be submitted to the input/output temperature controller. During heating, the temperature sensors may sense the temperature of the build material particles 16, and the temperature measurements may be transmitted to the input/output temperature controller. For example, a thermometer associated with the heated area can provide temperature feedback. The input/output temperature controller may adjust the radiation source 38, 38' power set points based on any difference between the recipe and the real-time measurements. These power set points are sent to the lamp/laser drivers, which transmit appropriate lamp/laser voltages to the radiation source 38, 38'. This is one example of the radiation system components 40, and it is to be understood that other radiation source control systems may be used. For example, the controller 34 may be configured to control the radiation source 38, 38'.

Figure 2:
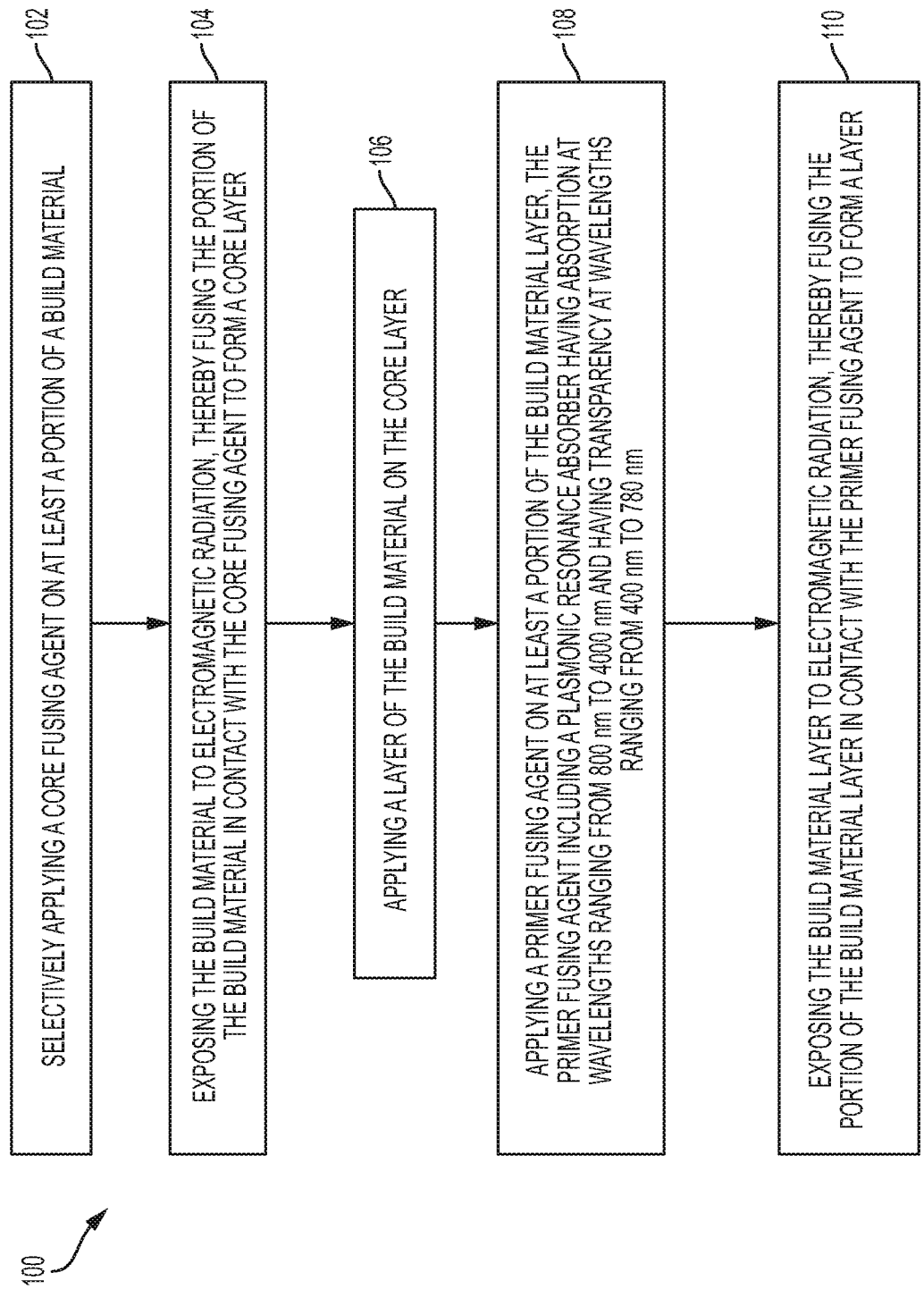
FIG. 2 is a flow diagram illustrating an example of a 3D printing method.

Referring now to FIG. 2, an example of the 3D printing method 100 is depicted. This example of the method uses the core fusing agent 28 and the fusing agent 26 or 26' (i.e., low tint fusing agent or primer fusing agent). This method 100 may be used to form core layer(s) having mechanical integrity, and to form an outer white layer or a primer layer and an outer colored layer on the core layer(s).

One example of the method 100 includes selectively applying the core fusing agent 18 on at least a portion of the build material (i.e., build material particles 16) (reference numeral 102); exposing the build material 16 to electromagnetic radiation, thereby fusing the portion of the build material 16 in contact with the core fusing agent 28 to form a core layer (reference numeral 104); applying a layer of the build material 16 on the core layer (reference numeral 106); applying the primer fusing agent 26, 26' on at least a portion of the build material layer (reference numeral 108); and exposing the build material layer to electromagnetic radiation, thereby fusing the portion of the build material layer in contact with the primer fusing agent 26, 26' to form a layer (reference numeral 110). The layer that is formed with the primer fusing agent 26, 26' may be a primer layer (upon which other layer(s) is/are formed) or may be an outer layer (or one of several layer(s) forming an outer region) of the part that is formed.

Figure 3:
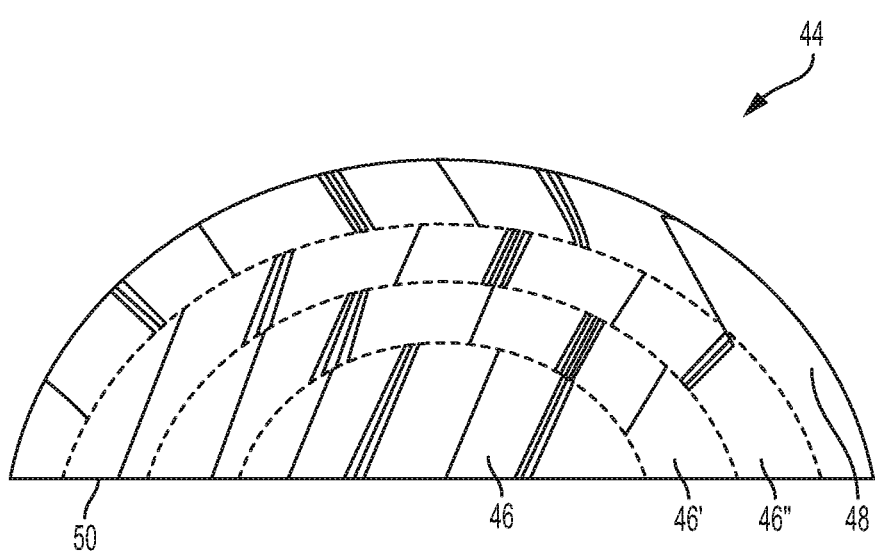
FIG. 3 is a cross-sectional view of an example of a part formed using an example of the 3D printing method disclosed herein.

The method 100 may be used to form a part 44 as shown in FIG. 3, which includes several core layers 46, 46', 46" and an outer white layer 48. The core layers 46, 46', 46" are sequentially formed by selectively patterning respective build material layers with the core fusing agent 28 and exposing each patterned layer to electromagnetic radiation. The outer white layer 48 is formed by applying a build material layer on the outermost core layer 46", patterning it with the fusing agent 26, 26', and exposing it to electromagnetic radiation. The outer white layer 48 provides the part 44 with a white (or slightly tinted) exterior surface. As such, the outer white layer 48 optically isolates the black core layer(s) 46, 46', 46" that it covers.

In the example part 44 shown in FIG. 3, the outer white layer 48 does not completely surround the part 44, but rather may be formed on the outer surface(s) of the core layer 46" that will be visible. For example, in FIG. 3, the surface 50 of the part 44 may not be visible when the part 44 is in use, and thus it may not be desirable to form the outer white layer 48 on this surface 50.

It is to be understood that the method 100 may include additional processing to form the part 44 with an outer colored layer (not shown in FIG. 3) on at least a portion of the outer white layer 48, or to form another part 44' (shown in FIG. 4H) which has the core layer(s) 46 completely encapsulated by a primer layer (including primer layer portions 48', 48", 48''', which are referred to herein respectively as primer layers 48, 48', 48") and an outer colored layer (including colored layer portions 52, 52', 52", which are referred to herein as colored layers 52, 52', 52"). The method 100' to form the part 44' will now be discussed in reference to FIGS. 4A through 4H. Throughout the method, a single inkjet applicator may be labeled with multiple reference numbers (24A, 24B and/or 24C), although it is to be understood that the applicators may be separate applicators or a single applicator with several individual cartridges for dispensing the respective fluids.

In FIGS. 4A and 4B, a layer 54 of the build material particles 16 is applied on the build area platform 12. In FIG. 4A, the build material supply 14 may supply the build material particles 16 into a position so that they are ready to be spread onto the build area platform 12. In FIG. 4B, the build material distributor 18 may spread the supplied build material particles 16 onto the build area platform 12. The controller 34 may execute control build material supply instructions to control the build material supply 14 to appropriately position the build material particles 16, and may execute control spreader instructions to control the build material distributor 18 to spread the supplied build material particles 16 over the build area platform 12 to form the layer 54 of build material particles 16 thereon. As shown in FIG. 4B, one layer 54 of the build material particles 16 has been applied.

The layer 54 has a substantially uniform thickness across the build area platform 12. In an example, the thickness of the layer 54 ranges from about 50 µm to about 300 µm, although thinner or thicker layers may also be used. For example, the thickness of the layer 54 may range from about 20 µm to about 500 µm, or from about 30 µm to about 300 µm. The layer thickness may be about 2× the particle diameter at a minimum for finer part definition.

To form the part 44 shown in FIG. 3, this layer 54 of build material would be patterned with the core fusing agent 28 (i.e., the core fusing agent 28 would be selectively dispensed on the layer 54 according to a pattern of a cross-section for the core layer 46), and then exposed to electromagnetic radiation to form the core layer 46. As used herein, the cross-section of the layer of the part to be formed refers to the cross-section that is parallel to the contact surface of the build area platform 12. As an example, if the core layer 46 is to be shaped like a cube or cylinder, the core fusing agent 28 will be deposited in a square pattern or a circular pattern (from a top view), respectively, on at least a portion of the layer 54 of the build material particles 16.

In the example shown in FIG. 4B, the layer 54 of build material particles 16 is a sacrificial layer that is used to enhance the color of the first layer (e.g., colored layer 52) of the part 44' that is being formed. As shown in FIG. 4B, the colored inkjet ink 30 is selectively applied to at least the portion 56 of the layer 54. As such, the build material particles 16 in this portion 56 of the layer 54 become colored. In this example, this sacrificial layer 54 is not fused (as no fusing agent 26, 26' or core fusing agent 28 is applied thereon). Rather, some of the colored build material particles 16 in the sacrificial layer 54 may become embedded in fused build material particles of the part layer (e.g., colored layer 52) that is formed thereon. In other words, some of the colored build material 16 in portion 56 may become embedded in the surface of the part layer that is formed adjacent thereto. The unfused, but embedded colored build material particles 16 may help to maintain saturation at the surface (of the ultimately formed colored layer 52) by providing a colored interface between the colored layer 52 and surrounding unfused build material particles 16.

While a sacrificial layer 54 is shown, it is to be understood that several sacrificial layers 54 may be sequentially formed in contact with one another.

The color of the colored inkjet ink 30 that is applied to the portion(s) 56 of the sacrificial layer 54 will depend upon the desired color for the part 44' or at least the portion of the colored layer 52 formed adjacent thereto. As examples, cyan ink, magenta ink, and yellow ink may be applied alone or in combination to achieve a variety of colors, and black ink (i.e., non-fusing black ink) may be printed with any of the other inks to alter the color or to lower the L* of the resulting color.

While not shown in FIG. 4B, the detailing agent 42 may be selectively applied on the portion 56 with the colored inkjet ink 30. The detailing agent 42 may be used to maintain the temperature of the build material particles 16 in contact therewith below the melting point or softening point of the build material particles 16. Since the sacrificial layer 54 is not to be fused, the detailing agent 42 may be applied to this layer 54 with the colored inkjet ink 30.

The colored inkjet ink 30 will penetrate at least partially into the sacrificial layer 54. Depending upon the particle size of the colorant in the colored inkjet ink 30 and size of the voids between the build material particles 16, the colored inkjet ink 30 may penetrate throughout the entire thickness of the sacrificial layer 54. This creates a surface upon which a subsequent layer 58 of build material particles 16 may be applied.

The layer 58 of the build material particles 16 may be applied in the same manner as the layer 54. The layer 58 is shown in FIG. 4C. The layer 58 may be considered to be the first build material layer because at least a portion of this layer 58 will be fused to form the first layer of the 3D part 44' (since the sacrificial layer 54 is not fused).

Prior to further processing, the layer 58 of the build material particles 16 may be exposed to heating. Heating may be performed to pre-heat the build material particles 16, and thus the heating temperature may be below the melting point or softening point of the build material particles 16. As such, the temperature selected will depend upon the build material particles 16 that are used. As examples, the pre-heating temperature may be from about 5° C. to about 50° C. below the melting point or softening point of the build material particles 16. In an example, the pre-heating temperature ranges from about 50° C. to about 350° C. In another example, the pre-heating temperature ranges from about 150° C. to about 170° C.

Pre-heating the layer 58 of the build material particles 16 may be accomplished using any suitable heat source that exposes all of the build material particles 16 on the build material surface 12 to the heat. Examples of the heat source include a thermal heat source (e.g., a heater (not shown) of the particles 16) or the electromagnetic radiation source 38, 38'.

After the layer 58 is formed, and in some instances is pre-heated, the fusing agent 26, 26' or the core fusing agent 28 and the colored inkjet ink 30 are selectively applied on the same portion(s) of the build material particles 16 in the layer 58. In FIG. 4C, the fusing agent 26, 26' and the colored inkjet ink 30 are shown being applied to the portion 60 of the layer 58. The fusing agent 26, 26' or the core fusing agent 28 and the colored inkjet ink 30 are selectively applied in a pattern of a cross-section for the colored layer 52 that is to be formed (shown in FIG. 4D).

In the example shown in FIG. 4C, the portion 60 is adjacent to the portion 56 of the layer 54 to which the colored inkjet ink 30 has been applied.

When the desired color for the part 44' or a particular colored layer 52 of the part 44' is the color of the colored inkjet ink 30, the fusing agent 26, 26' is applied with the colored inkjet ink 30. Since the fusing agent 26, 26' is clear or slightly tinted, the color of the colored inkjet ink 30 will be the color of the resulting colored layer 52, as the colorants of the colored inkjet ink 30 become embedded throughout the fused build material particles of the colored layer 52. The fusing agent 26, 26' may be particularly suitable for obtaining lighter colors or white. When the desired color for colored layer 52 is a darker color or black, the core fusing agent 28 may be applied with the colored inkjet ink 30.

After the fusing agent 26, 26' or the core fusing agent 28 and the colored inkjet ink 30 are selectively applied in the specific portion(s) 60 of the layer 58, the entire layer 58 of the build material 16 is exposed to electromagnetic radiation (shown as EMR Exposure between FIGS. 4C and 4D).

The electromagnetic radiation is emitted from the radiation source 38, 38'. The length of time the electromagnetic radiation is applied for, or energy exposure time, may be dependent, for example, on one or more of: characteristics of the radiation source 38, 38'; characteristics of the build material particles 16; and/or characteristics of the fusing agent 26, 26' or core fusing agent 28.

The fusing agent 26, 26' or the core fusing agent 28 enhances the absorption of the radiation, converts the absorbed radiation to thermal energy, and promotes the transfer of the thermal heat to the build material particles 16 in contact therewith. In an example, the fusing agent 26, 26' or the core fusing agent 28 sufficiently elevates the temperature of the build material particles 16 in layer 58 above the melting or softening point of the particles 16, allowing fusing (e.g., sintering, binding, curing, etc.) of the build material particles to take place. Exposure to electromagnetic radiation forms the colored layer 52, as shown in FIG. 4D.

Still further, it is to be understood that portions of the build material 16 that do not have the fusing agent 26, 26' or the core fusing agent 28 applied thereto do not absorb enough energy to fuse. However, the generated thermal energy may propagate into the surrounding build material 16 that does not have fusing agent 26, 26' or the core fusing agent 28 applied thereto. The propagation of thermal energy may be inhibited from fusing the non-patterned build material particles 16 in the layer 58, for example, when the detailing agent 42 is applied to the build material particles 16 in the layer 58 that are not exposed to the fusing agent 26, 26' or the core fusing agent 28. Moreover, the propagation of thermal energy may be inhibited from fusing the build material particles 16 in the layer 54 when the detailing agent 42 is applied with the colored inkjet ink 30 in the layer 54. However, as mentioned above, some of the colored build material particles 16 in the layer 54 may become embedded in the adjacent surface of the fused build material particles of the colored layer 52.

While a single colored layer 52 is shown, it is to be understood that several colored layers 52 may be sequentially formed in contact with one another so that a color region (thicker than one voxel) is built up around the core layer(s) 46 in the final part 44'. The outermost colored layer 52 may form a one voxel deep shell, and the other colored layers may create the thicker color region. The fluid levels of the fusing agent 26, 26' or core fusing agent 28 and the colored inkjet ink 30 may be higher in the outermost colored layer 52, compared to other colored layers positioned closer to the core layer(s) 46, in order to increase color saturation at the exterior of the formed part 44'.

FIG. 4D also illustrates yet another layer 62 of the build material particles 16, this time the layer 62 being applied to the colored layer 52 and to any unfused build material particles 16 of layer 58. The layer 62 may be applied in the same manner as the layers 54, 58.

Prior to further processing, the layer 62 of the build material particles 16 may be exposed to pre-heating in the manner previously described.

After the layer 62 is formed, and in some instances is pre-heated, the fusing agent 26, 26' is selectively applied on portion(s) 64 of the build material particles 16 in the layer 62. The portion(s) 64 of the layer 62 will form the primer layer 48', which is white, clear, or slightly tinted from the fusing agent 26, 26'. This primer layer 48' is positioned between the colored layer 52 and subsequently formed black core layer(s) 46 in the part 44' (see FIG. 4H). This primer layer 48' may be referred to as the initial layer or the first primer layer. The primer layer 48' optically isolates at least a portion of the black core layer(s) 46.

In the example shown in FIG. 4D, the portion 64 to which the fusing agent 26, 26' is selectively applied is adjacent to part (but not all) of the already formed colored layer 52. Selectively applying the fusing agent 26, 26' in this manner may be performed when it is desirable to form colored layer(s) 52' (shown in FIG. 4E) along the sides of the part 44' that is being formed. To form the colored layer(s) 52' along the sides of the part 44', the fusing agent 26, 26' or the core fusing agent 28 and the colored inkjet ink 30 are selectively applied on other portion(s) 66 of the build material particles 16 in the layer 62. As an example, the portion(s) 66 may define the perimeter of that particular layer of the part 44' that is being formed, and may be outside of a perimeter or an edge boundary E (i.e., the outermost portions where the fusing agent 26, 26' alone is selectively deposited in any build material layer) of the portion 64.

When it is desirable to form the colored layer 52' (shown in FIG. 4E) along the sides of the part 44' that is being formed, it may also be desirable to selectively deposit the colored inkjet ink 30 (with or without the detailing agent 42) in portion(s) 68 of the unpatterned build material particles 16 which are adjacent to or surround the portion(s) 66 (which when fused, will form the colored layer 52' along the sides of the part 44'). The colored build material particles 16 in the portion(s) 68 may become embedded in fused build material particles of the colored layer 52'. This unfused, but embedded colored build material 16 may help to maintain saturation at the surface (of the colored layer 52') by providing a colored interface between the colored layer 52' and surrounding unfused build material particles 16.

If it is not desirable to color the sides of the part 44', the portion 64 to which the fusing agent 26, 26' is selectively applied may be adjacent to some or all of the already formed colored layer 52, but the fusing agent 26, 26' or the core fusing agent 28 and the colored inkjet ink 30 will not be selectively applied on portion(s) 66 of the build material particles 16 in the layer 62.

After the fusing agent 26, 26' is applied on the portion(s) 64, and in some instances the fusing agent 26, 26' or the core fusing agent 28 and the colored inkjet ink 30 are selectively applied on the portion(s) 66, the entire layer 62 of the build material particles 16 is exposed to electromagnetic radiation (shown as EMR Exposure between FIGS. 4D and 4E) in the manner previously described.

In this example, fusing agent 26, 26' enhances the absorption of the radiation in portion 64, converts the absorbed radiation to thermal energy, and promotes the transfer of the thermal heat to the build material particles 16 in contact therewith. In an example, the fusing agent 26, 26' sufficiently elevates the temperature of the build material particles 16 in portion 64 above the melting or softening point of the particles 16, allowing fusing (e.g., sintering, binding, curing, etc.) of the build material particles to take place. Exposure to electromagnetic radiation forms the primer layer 48', as shown in FIG. 4E.

If the fusing agent 26, 26' or the core fusing agent 28 and the colored inkjet ink 30 are selectively applied on the portion(s) 66, the EMR exposure will form colored layer(s) 52' at the outer edge(s). At these portion(s) 66, the fusing agent 26, 26' or the core fusing agent 28 enhances the absorption of the radiation, converts the absorbed radiation to thermal energy, and promotes the transfer of the thermal heat to the build material particles 16 in contact therewith, causing them to fuse. This exposure to electromagnetic radiation forms the colored layer(s) 52', as shown in FIG. 4E.

The width of the colored layer(s) 52' may be large enough to form the color region at this portion of the part 44'. The fluid levels of the fusing agent 26, 26' or core fusing agent 28 and the colored inkjet ink 30 may be higher at the outermost edge of the colored layer(s) 52', compared to the innermost edge(s) of the colored layer(s) 52', in order to increase color saturation at the exterior of the formed part 44'.

FIG. 4E also illustrates yet another layer 70 of the build material particles 16, this time the layer 70 being applied to the primer layer 48', the colored layer(s) 52', and to any unfused build material particles 16 of layer 62. The layer 70 may be applied in the same manner as the layers 54, 58, 62.

Prior to further processing, the layer 70 of the build material particles 16 may be exposed to pre-heating in the manner previously described.

After the layer 70 is formed, and in some instances is pre-heated, the core fusing agent 28 is selectively applied on portion(s) 72 of the build material particles 16 in the layer 70. The portion(s) 72 of the layer 70 will form the core layer 46 (FIG. 4F), which may be black from the core fusing agent 28. While a single core layer 46 is shown, it is to be understood that several core layers 46 may be sequentially formed in contact with one another so that a core region (or part core) is built up, which makes up the bulk of the part 44'. Several core layers 46 may enhance the mechanical properties of the part 44'.

In the example shown in FIG. 4E, the portion 72 to which the core fusing agent 28 is selectively applied is adjacent to part (but not all) of the already formed primer layer 48'. Selectively applying the core fusing agent 28 in this manner may be performed when it is desirable to form colored layer(s) 52' (shown in FIG. 4F) along the sides of the part 44' that is being formed. Since the core layer 46 being formed may be black, it may also be desirable to form the primer layer 48" between the core layer 46 and the adjacent colored layer(s) 52'.

To form the primer layer 48" along the perimeter of the core layer 46, the fusing agent 26, 26' is selectively applied on other (or second) portion(s) 74 of the build material particles 16 in the layer 70 that are immediately adjacent to the perimeter or edge boundary E' (i.e., the outermost portions where the core fusing agent 28 alone is selectively deposited in any build material layer) of the portion 72. The perimeter/edge boundary E' is thus defined by the core fusing agent 28. To form the colored layer(s) 52' along/adjacent to the perimeter of the primer layer 48", the fusing agent 26, 26' or the core fusing agent 28 and the colored inkjet ink 30 are selectively applied on still other (or third) portion(s) 76 of the build material particles 16 in the layer 70 that are immediately adjacent to the perimeter or edge boundary E of the portion 74 (which is defined by the primer fusing agent 26, 26').

When it is desirable to form the colored layer(s) 52' (shown in FIG. 4F) along the sides of the part 44' that is being formed, it may also be desirable to selectively deposit the colored inkjet ink 30 (with or without the detailing agent 42) in portion(s) 78 of the unpatterned build material particles 16 which are adjacent to or surround the portion(s) 76 (which when fused, will form the colored layer 52' along the sides of the part 44'). The colored build material particles 16 in the portion(s) 78 may become embedded in fused build material particles of the colored layer 52'. The unfused, but embedded colored build material particles 16 may help to maintain saturation at the surface (of the colored layer 52') by providing a colored interface between the colored layer(s) 52' and surrounding unfused build material particles 16.

If it is not desirable to color the sides of the part 44' (e.g., if some of the core layer 46 is to be exposed/visible, the portion 72 to which the fusing agent 28 is selectively applied may be adjacent to some or all of the already formed layers 48', 52', but the fusing agent 26, 26' will not be selectively applied on the portion(s) 74 and the fusing agent 26, 26' or the core fusing agent 28 and the colored inkjet ink 30 will not be selectively applied on portion(s) 76 of the build material particles 16 in the layer 70.

After the layer 70 is patterned in a desirable manner with at least the core fusing agent 28, the entire layer 70 of the build material particles 16 is exposed to electromagnetic radiation (shown as EMR Exposure between FIGS. 4E and 4F) in the manner previously described.

In this example, fusing agent 28 enhances the absorption of the radiation in portion 72, converts the absorbed radiation to thermal energy, and promotes the transfer of the thermal heat to the build material particles 16 in contact therewith. In an example, the fusing agent 28 sufficiently elevates the temperature of the build material particles 16 in portion 72 above the melting or softening point of the particles 16, allowing fusing (e.g., sintering, binding, curing, etc.) of the build material particles to take place. Exposure to electromagnetic radiation forms the core layer 46, as shown in FIG. 4F.

If the fusing agent 26, 26' is selectively applied on the portion(s) 74, and the fusing agent 26, 26' or the core fusing agent 28 and the colored inkjet ink 30 are selectively applied on the portion(s) 76, the EMR exposure will also form primer layer(s) 48" and colored layer(s) 52' at the outer edge(s) of the core layer 46. At these portion(s) 74, 76, the agent(s) 26, 26' and/or 28 enhance the absorption of the radiation in portion(s) 74, 76, convert the absorbed radiation to thermal energy, and promote the transfer of the thermal heat to the build material particles 16 in contact therewith, causing them to fuse. This exposure to electromagnetic radiation forms primer layer(s) 48" and colored layer(s) 52', as shown in FIG. 4F.

The width of the primer layer(s) 48" may be large enough to optically isolate the black core layer 46. The width of the colored layer(s) 52' may be large enough to form the color region at this portion of the part 44'. The fluid levels of the fusing agent 26, 26' or core fusing agent 28 and the colored inkjet ink 30 may be higher at the outermost edge of the colored layer(s) 52', compared to the innermost edge(s) of the colored layer(s) 52', in order to increase color saturation at the exterior of the formed part 44'.

FIG. 4F also illustrates yet another layer 80 of the build material particles 16, this time the layer 80 being applied to the core layer 46, the primer layer(s) 48", the colored layer(s) 52', and to any unfused build material particles 16 of layer 70. The layer 80 may be applied in the same manner as the layers 54, 58, 62, 70.

Prior to further processing, the layer 80 of the build material particles 16 may be exposed to pre-heating in the manner previously described.

After the layer 80 is formed, and in some instances is pre-heated, the fusing agent 26, 26' is selectively applied on portion(s) 82 of the build material particles 16 in the layer 80. The portion(s) 82 of the layer 82 will form another primer layer 48''', which is white or slightly tinted from the fusing agent 26, 26'. This primer layer 48''' is positioned between the black core layer(s) 46 and subsequently formed colored layer(s) 52" in the part 44' (see FIG. 4H). As such, the primer layer 48''' optically isolates the black core layer(s) 46 at another end of the formed part 44'.

In the example shown in FIG. 4F, the portion 82 to which the fusing agent 26, 26' is selectively applied is adjacent to the already formed core layer(s) 46 and primer layer(s) 48". Selectively applying the fusing agent 26, 26' in this manner may be performed when it is desirable to form colored layer(s) 52' (shown in FIG. 4G) along the sides of the part 44' that is being formed. To form the colored layer(s) 52' along the sides of the part 44', the fusing agent 26, 26' or the core fusing agent 28 and the colored inkjet ink 30 are selectively applied on portion(s) 84 of the build material particles 16 in the layer 82. As an example, the portion(s) 84 may define the perimeter of that particular layer of the part 44' that is being formed, and may be outside of an edge boundary E of the portion 82.

When it is desirable to form the colored layer 52' (shown in FIG. 4G) along the sides of the part 44' that is being formed, it may also be desirable to selectively deposit the colored inkjet ink 30 (with or without the detailing agent 42) in portion(s) 86 of the unpatterned build material particles 16 which are adjacent to or surround the portion(s) 84 (which when fused, will form the colored layer 52' along the sides of the part 44'). The colored build material particles 16 in the portion(s) 86 may become embedded in fused build material particles of the colored layer 52'. The unfused, but embedded colored build material particles 16 may help to maintain saturation at the surface (of the colored layer 52') by providing a colored interface between the colored layer 52' and surrounding unfused build material particles 16.

If it is not desirable to color the sides of the part 44', the portion 82 to which the fusing agent 26, 26' is selectively applied may be adjacent to some or all of the already formed colored layer 52', but the fusing agent 26, 26' or the core fusing agent 28 and the colored inkjet ink 30 will not be selectively applied on portion(s) 84 of the build material particles 16 in the layer 80.

After the fusing agent 26, 26' is applied on the portion(s) 82, and in some instances the fusing agent 26, 26' or the core fusing agent 28 and the colored inkjet ink 30 are selectively applied on the portion(s) 84, the entire layer 80 of the build material particles 16 is exposed to electromagnetic radiation (shown as EMR Exposure between FIGS. 4F and 4G) in the manner previously described.

In this example, fusing agent 26, 26' enhances the absorption of the radiation in portion 82, converts the absorbed radiation to thermal energy, and promotes the transfer of the thermal heat to the build material particles 16 in contact therewith. In an example, the fusing agent 26, 26' sufficiently elevates the temperature of the build material particles 16 in portion 82 above the melting or softening point of the particles 16, allowing fusing (e.g., sintering, binding, curing, etc.) of the build material particles to take place. Exposure to electromagnetic radiation forms the primer layer 48''', as shown in FIG. 4G.

If the fusing agent 26, 26' or the core fusing agent 28 and the colored inkjet ink 30 are selectively applied on the portion(s) 84, the EMR exposure will form colored layer(s) 52' at the outer edge(s) of the primer layer 48'''. At these portion(s) 84, the fusing agent 26, 26' or the core fusing agent 28 enhances the absorption of the radiation, converts the absorbed radiation to thermal energy, and promotes the transfer of the thermal heat to the build material particles 16 in contact therewith, causing them to fuse. This exposure to electromagnetic radiation forms the colored layer(s) 52', as shown in FIG. 4G.

The width of the colored layer(s) 52' may be large enough to form the color region at this portion of the part 44'. The fluid levels of the fusing agent 26, 26' or core fusing agent 28 and the colored inkjet ink 30 may be higher at the outermost edge of the colored layer(s) 52', compared to the innermost edge(s) of the colored layer(s) 52', in order to increase color saturation at the exterior of the formed part 44'.

FIG. 4G also illustrates yet another layer 88 of the build material particles 16, this time the layer 88 being applied to the primer layer(s) 48''' and the colored layer(s) 52' adjacent thereto, and to any unfused build material particles 16 of layer 80. The layer 88 may be applied in the same manner as the layers 54, 58, 62, 70, 80.

Prior to further processing, the layer 88 of the build material particles 16 may be exposed to pre-heating in the manner previously described.

After the layer 88 is formed, and in some instances is pre-heated, the fusing agent 26, 26' or the core fusing agent 28 and the colored inkjet ink 30 are selectively applied on the same portion(s) of the build material particles 16 in the layer 88. In FIG. 4G, the fusing agent 26, 26' and the colored inkjet ink 30 are shown being applied to the portion 90 of the layer 88. The fusing agent 26, 26' or the core fusing agent 28 and the colored inkjet ink 30 are selectively applied in a pattern of a cross-section for the colored layer 52" that is to be formed (shown in FIG. 4H).

In the example shown in FIG. 4G, the portion 90 is adjacent to the primer layer 48''' and the colored layer(s) 52' adjacent to the primer layer 48'''.

When the desired color for the part 44' or a particular colored layer 52" of the part 44' is the color of the colored inkjet ink 30, the fusing agent 26, 26' is applied with the colored inkjet ink 30. Since the fusing agent 26, 26' is clear or slightly tinted, the color of the colored inkjet ink 30 will be the color of the resulting colored layer 52", as the colorants of the colored inkjet ink 30 become embedded throughout the fused build material particles of the colored layer 52". The fusing agent 26, 26' may be particularly suitable for obtaining lighter colors or white. When the desired color for colored layer 52" is a darker color or black, the core fusing agent 28 may be applied with the colored inkjet ink 30.

It may also be desirable to selectively deposit the colored inkjet ink 30 (with or without the detailing agent 42) in portion(s) 92 of the unpatterned build material particles 16 which are adjacent to or surround the portion(s) 90 (which when fused, will form the colored layer 52" along the top surface of part 44'). The colored build material particles 16 in the portion(s) 92 may become embedded in fused build material particles along the sides or edges of the colored layer 52". The unfused, but embedded colored build material particles 16 may help to maintain saturation at the surface (of the colored layer 52") by providing a colored interface between the colored layer 52" and surrounding unfused build material particles 16.

After the fusing agent 26, 26' or the core fusing agent 28 and the colored inkjet ink 30 are selectively applied in the specific portion(s) 90 of the layer 88, the entire layer 88 of the build material 16 is exposed to electromagnetic radiation (shown as EMR Exposure between FIGS. 4G and 4H). The electromagnetic radiation is emitted from the radiation source 38, 38' in the manner previously described.

The fusing agent 26, 26' or the core fusing agent 28 enhances the absorption of the radiation, converts the absorbed radiation to thermal energy, and promotes the transfer of the thermal heat to the build material particles 16 in contact therewith. In an example, the fusing agent 26, 26' or the core fusing agent 28 sufficiently elevates the temperature of the build material particles 16 in the portion 90 of the layer 88 above the melting or softening point of the particles 16, allowing fusing (e.g., sintering, binding, curing, etc.) of the build material particles (in contact with the agent 26, 26' or 28) to take place. Exposure to electromagnetic radiation forms the colored layer 52", as shown in FIG. 4H, having colorants of the inkjet ink 30 embedded therein.

While a single colored layer 52" is shown, it is to be understood that several colored layers 52" may be sequentially formed in contact with one another so that a color region (thicker than one voxel) is built up around the core layer(s) 46 in the final part 44'. The outermost colored layer 52" may form a one voxel deep shell, and the other colored layers may create the thicker color region. The fluid levels of the fusing agent 26, 26' or core fusing agent 28 and the colored inkjet ink 30 may be higher in the outermost colored layer 52", compared to other colored layers positioned closer to the core layer(s) 46, in order to increase color saturation at the exterior of the formed part 44'.

While not shown, the colored inkjet ink 30 may be selectively applied to the colored layer 52". The colored inkjet ink 30 applied to the colored layer 52" may help to maintain saturation at the surface of the colored layer 52" by coloring the build material particles at the surface, whether these particles are fused or unfused and embedded in the fused particles.

The color of the colored inkjet ink 30 that is applied to the colored layer 52" will depend upon the desired color for the part 44' or at least for the colored layer 52" to which the ink 30 is applied. As examples, cyan ink, magenta ink, and yellow ink may be applied alone or in combination to achieve a variety of colors, and black ink (i.e., non-fusing black ink) may be printed with any of the other inks to alter the color or to lower the L* of the resulting color.

Also while not shown, it is to be understood that the detailing agent 42 may be selectively applied on the colored layer 52" with the colored inkjet ink 30.

It to be further understood that the method 100' may be modified so that the sacrificial layer 54 (with inkjet ink 30 thereon) and the outer colored layers 52, 52', 52" are not formed. In this modified form of the method 100', the primer layer 48' would be formed first. In the resulting part, all of the primer layers 48', 48", 48''' would be exposed/visible, and thus would form the exterior of the part. In this example, the primer layers 48', 48", 48''' would form an outer white layer which encapsulates the core layer(s) 46. When the method 100' is modified in this manner, the part that is formed is white or slightly tinted (depending upon the color of the fusing agent 26, 26').

Figure 5:
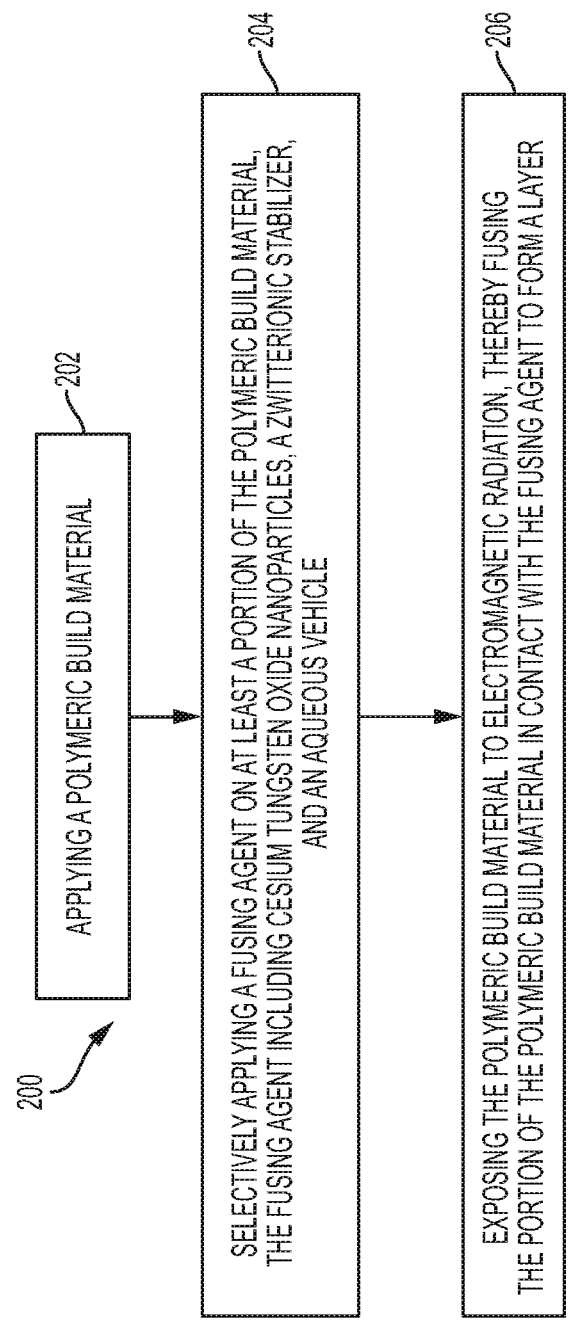
FIG. 5 is a flow diagram illustrating another example of a 3D printing method.

Referring now to FIG. 5, another example of the 3D printing method 200 is depicted. This example of the method uses the fusing agent 26', which includes the CTO nanoparticles, the zwitterionic stabilizer, and the aqueous vehicle.

Figure 6C:
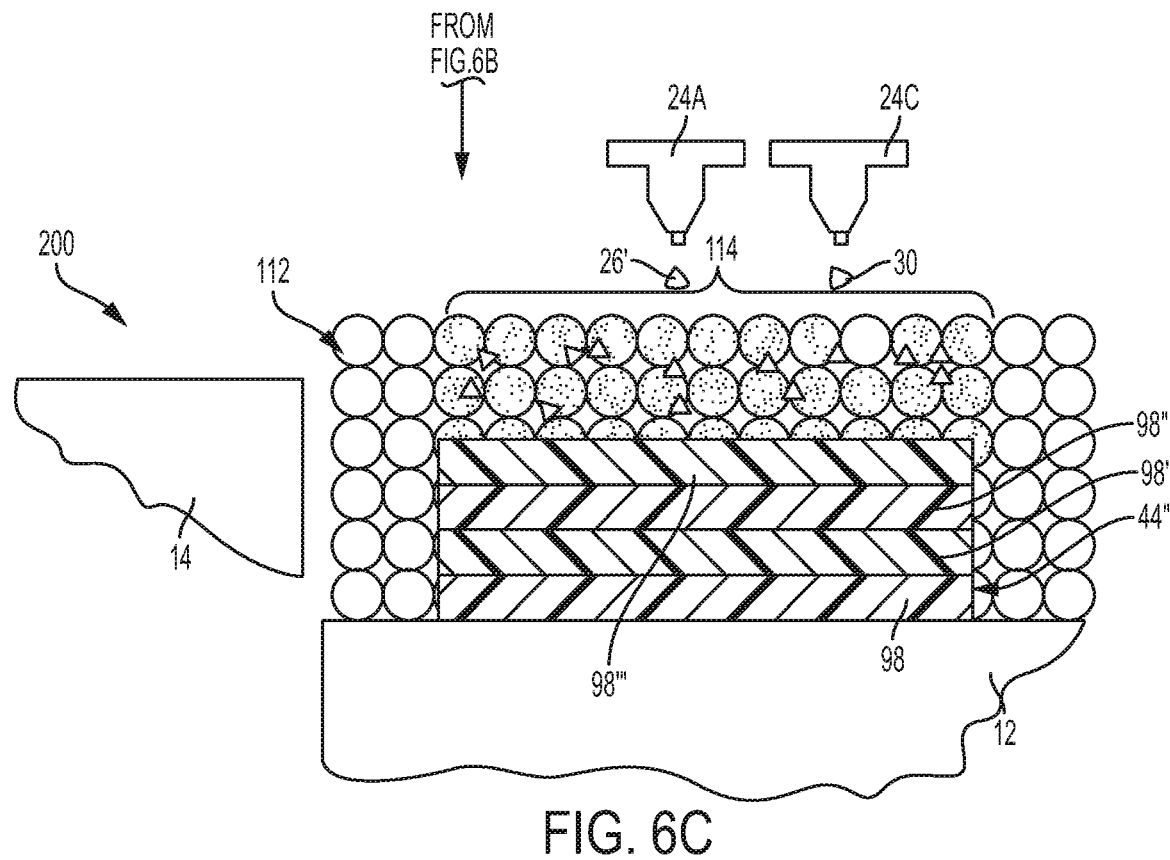

This method 200 may be used to form a white or slightly tinted part 44" (shown in FIG. 6C).

One example of the method 200 includes applying the polymeric build material (i.e., build material particles 16) (reference numeral 202); selectively applying the fusing agent 26' on at least a portion of the polymeric build material, where, as noted above, the fusing agent 26' includes the CTO nanoparticles, the zwitterionic stabilizer, and the aqueous vehicle (reference numeral 204); and exposing the polymeric build material to electromagnetic radiation, thereby fusing the portion of the polymeric build material in contact with the fusing agent 26' to a layer (reference numeral 206). FIGS. 6A through 6D illustrate examples of the method 200.

In FIG. 6A, a layer 94 of the build material particles 16 is applied on the build area platform 12. As previously described, the build material supply 14 may supply the build material particles 16 into a position so that they are ready to be spread onto the build area platform 12, and the build material distributor 18 may spread the supplied build material particles 16 onto the build area platform 12. The controller 34 may execute control build material supply instructions to control the build material supply 14 to appropriately position the build material particles 16, and may execute control spreader instructions to control the build material distributor 18 to spread the supplied build material particles 16 over the build area platform 12 to form the layer 94 of build material particles 16 thereon.

The layer 94 of the build material particles 16 may be exposed to pre-heating in the manner described herein.

After the layer 94 is applied, and in some instances is pre-heated, the fusing agent 26' is selectively applied on portion(s) 96 of the build material particles 16 in the layer 94. The portion(s) 96 of the layer 62 will form the first layer 98 of the 3D part 44" (FIG. 6C) or 44'" (FIG. 6D) being formed. As such, the fusing agent 26' is selectively dispensed on the layer 94 according to a pattern of a cross-section for the layer 98.

After the fusing agent 26' is applied on the portion(s) 96, the entire layer 94 of the build material particles 16 is exposed to electromagnetic radiation (shown as EMR Exposure between FIGS. 6A and 6B) in the manner previously described.

In this example, fusing agent 26' enhances the absorption of the radiation in portion(s) 96, converts the absorbed radiation to thermal energy, and promotes the transfer of the thermal heat to the build material particles 16 in contact therewith. In an example, the fusing agent 26' sufficiently elevates the temperature of the build material particles 16 in portion 96 above the melting or softening point of the particles 16, allowing fusing (e.g., sintering, binding, curing, etc.) of the build material particles 16 to take place. Exposure to electromagnetic radiation forms the layer 98, as shown in FIG. 6B.

It is to be understood that portions of the build material 16 that do not have the fusing agent 26' applied thereto do not absorb enough energy to fuse.

After the layer 98 is formed, additional layer(s) (e.g., 98', 98", 98'" shown in FIG. 6C) may be formed thereon to create an example of the 3D part 44" (shown in FIG. 6C). For example, to form the other layer 98', additional polymeric build material (i.e., particles 16) may be applied on the layer 98. The fusing agent 26' is then selectively applied on at least a portion of the additional build material particles 16, according to a pattern of a cross-section for the layer (e.g., 98') which is being formed. After the fusing agent 26' is applied, the entire layer of the additional polymeric build material (i.e., particles 16) is exposed to electromagnetic radiation in the manner previously described. The application of additional polymeric build material particles 16, the selective application of the fusing agent 26', and the electromagnetic radiation exposure may be repeated a predetermined number of cycles to form the part 44".

In the example shown in FIGS. 6A and 6B, color may be imparted to the entire part 44" by applying the colored inkjet ink 30 with the fusing agent 26' in each of the portions of the respective build material layers that form layers 98, 98', 98", 98'".

Figure 6D:
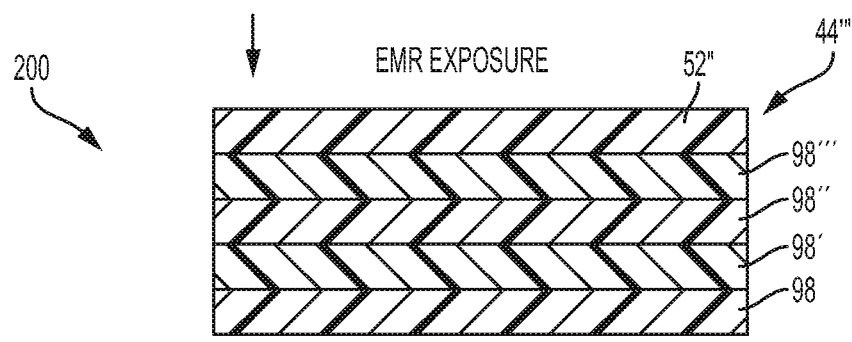

The method 200 may end at the formation of part 44" or color may be imparted to the top surface of the part 44". This is shown in FIGS. 6C and 6D.

To impart color and form the part 44'" (shown in FIG. 6D), a final layer 112 of the polymeric build material particles 16 is applied to the part 44". As shown in FIG. 6C, this layer 112 is applied to the outermost layer 98'" of the part 44". Prior to further processing, the layer 112 may be exposed to pre-heating in the manner previously described.

After the layer 112 is formed, and in some instances is pre-heated, the fusing agent 26' and the colored inkjet ink 30 are selectively applied on the same portion(s) 114 of the build material particles 16 in the layer 112. The fusing agent 26' and the colored inkjet ink 30 are selectively applied in a pattern of a cross-section for the colored layer 52" that is to be formed (shown in FIG. 6D). The color of the colored inkjet ink 30 that is applied will depend upon the desired color for the part 44'".

After the fusing agent 26' and the colored inkjet ink 30 are applied, the entire layer 112 of the polymeric build material (i.e., particles 16) is exposed to electromagnetic radiation in the manner previously described. The fusing agent 26' enhances the absorption of the radiation, converts the absorbed radiation to thermal energy, and promotes the transfer of the thermal heat to the build material particles 16 in contact therewith. In an example, the fusing agent 26' sufficiently elevates the temperature of the build material particles 16 in the portion 114 of the layer 112 above the melting or softening point of the particles 16, allowing fusing (e.g., sintering, binding, curing, etc.) of the build material particles (in contact with the agent 26') to take place. Exposure to electromagnetic radiation forms the colored layer 52", as shown in FIG. 6D, having colorants of the inkjet ink 30 embedded therein.

While a single colored layer 52" is shown, it is to be understood that several colored layers 52" may be sequentially formed in contact with one another so that a color region (thicker than one voxel) is built up on the layers 98, 98', 98", 98'" in the final part 44'". The outermost colored layer 52" may form a one voxel deep shell, and the other colored layers may create the thicker color region. The fluid levels of the fusing agent 26' and the colored inkjet ink 30 may be higher in the outermost colored layer 52", compared to other colored layers positioned closer to the layer 98'", in order to increase color saturation at the exterior of the formed part 44'".

While not shown, the colored inkjet ink 30 may be selectively applied to the colored layer 52". The colored inkjet ink 30 applied to the colored layer 52" may help to maintain saturation at the surface of the colored layer 52" by coloring the build material particles at the surface, whether these particles are fused or unfused and embedded in the fused particles.

It is to be understood that the method 200 may also be modified similarly to the method 100' in order to form colored layers (e.g., 52 and 52') so that the part 44''' is completely encapsulated by colored layers.

In any of the examples disclosed herein, when the 3D part 44, 44', 44", 44''' is complete, it may be removed from the build material platform 12, and any unfused build material 16 may be removed from the 3D part 44, 44', 44", 44'''.

It is to be understood that the ranges provided herein include the stated range and any value or sub-range within the stated range. For example, a range from about 2 wt % to about 35 wt % should be interpreted to include not only the explicitly recited limits of from about 2 wt % to about 35 wt %, but also to include individual values, such as 3.35 wt %, 5.5 wt %, 17.75 wt %, 28.85 wt %, etc., and sub-ranges, such as from about 3.35 wt % to about 16.5 wt %, from about 2.5 wt % to about 27.7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for adding color to a part during three-dimensional (3D) printing, the method comprising:
    selectively applying a core fusing agent on at least a portion of a first build material layer;
    exposing the first build material layer to electromagnetic radiation, thereby fusing the portion of the first build material layer in contact with the core fusing agent to form a core layer;
    applying a second build material layer on the core layer;
    applying a primer fusing agent on at least a portion of the second build material layer, wherein the primer fusing agent includes:
        cesium tungsten oxide nanoparticles;
        a zwitterionic stabilizer, wherein the zwitterionic stabilizer is selected from the group consisting of a C2 to C8 betaine, a C2 to C8 aminocarboxylic acid having a solubility of at least 10 g in 100 g of water, taurine, and combinations thereof; and
        an aqueous vehicle, wherein the aqueous vehicle includes water, a co-solvent, and a surfactant;
    exposing the second build material layer to electromagnetic radiation, thereby fusing the portion of the build material layer in contact with the primer fusing agent to form a primer layer;
    applying a third build material layer on the primer layer;
    applying a colored inkjet ink and i) the core fusing agent or ii) the primer fusing agent on at least a portion of the third build material layer; and
    exposing the third build material layer to electromagnetic radiation, thereby fusing the portion of the third build material layer in contact with the i) the core fusing agent or ii) the primer fusing agent to form a colored layer having a colorant of the inkjet ink embedded therein; and
    applying the colored inkjet ink on the colored layer, wherein the colored inkjet ink consists of a colorant, a dispersant, a co-solvent, water, and optionally an anti-kogation agent, a biocide, or combinations thereof.

2. The method as defined in claim 1, further comprising applying a detailing agent with the colored inkjet ink.

3. A 3D printing method, comprising:
    applying a polymeric build material;
    selectively applying a fusing agent on at least a portion of the polymeric build material, the fusing agent including:
        cesium tungsten oxide nanoparticles;
        a zwitterionic stabilizer, wherein the zwitterionic stabilizer is selected from the group consisting of a C2 to C8 betaine, a C2 to C8 aminocarboxylic acid having a solubility of at least 10 g in 100 g of water, taurine, and combinations thereof; and
        an aqueous vehicle, wherein the aqueous vehicle includes water and a surfactant;
    exposing the polymeric build material to electromagnetic radiation, thereby fusing the portion of the polymeric build material in contact with the fusing agent to form a layer;
    applying additional polymeric build material on the layer;
    applying the fusing agent on at least a portion of the additional polymeric build material;
    exposing the additional polymeric build material to electromagnetic radiation, thereby fusing the at least the portion of the additional polymeric build material to form an other layer;
    repeating the applying of additional polymeric build material, the applying of the fusing agent, and the exposing a predetermined number of cycles to form a part;
    applying a final layer of the build material on the part;
    applying a colored inkjet ink and the fusing agent on at least a portion of the final layer;
    exposing the final layer to electromagnetic radiation, thereby fusing the portion of the final layer in contact with the fusing agent to form a colored layer having a colorant of the inkjet ink embedded therein; and
    applying the colored inkjet ink on the colored layer;
    wherein the colored inkjet ink consists of a colorant, a dispersant, a co-solvent, water, and optionally an anti-kogation agent, a biocide, or combinations thereof.

4. A method for adding color to a part during three-dimensional (3D) printing, the method comprising:
    selectively applying a core fusing agent on at least a portion of a first build material layer;
    exposing the first build material layer to electromagnetic radiation, thereby fusing the portion of the first build material layer in contact with the core fusing agent to form a core layer;
    applying a second build material layer on the core layer;
    applying a primer fusing agent on at least a portion of the second build material layer, wherein the primer fusing agent includes:
        cesium tungsten oxide nanoparticles;
        a zwitterionic stabilizer, wherein the zwitterionic stabilizer is selected from the group consisting of a C2 to C8 betaine, a C2 to C8 aminocarboxylic acid having a solubility of at least 10 g in 100 g of water, taurine, and combinations thereof, wherein a weight ratio of the cesium tungsten oxide nanoparticles to the zwitterionic stabilizer ranges from 1:10 to 10:1; and
an aqueous vehicle, wherein the aqueous vehicle includes water, a co-solvent, and a surfactant; and
exposing the second build material layer to electromagnetic radiation, thereby fusing the portion of the build material layer in contact with the primer fusing agent to form a primer layer.

5. A method for adding color to a part during three-dimensional (3D) printing, the method comprising:
selectively applying a core fusing agent on at least a portion of a first build material layer;
exposing the first build material layer to electromagnetic radiation, thereby fusing the portion of the first build material layer in contact with the core fusing agent to form a core layer;
applying a second build material layer on the core layer;
applying a primer fusing agent on at least a portion of the second build material layer, wherein the primer fusing agent includes:
cesium tungsten oxide nanoparticles;
a zwitterionic stabilizer, wherein the zwitterionic stabilizer is a C2 to C8 aminocarboxylic acid having a solubility of at least 10 g in 100 g of water; and
an aqueous vehicle, wherein the aqueous vehicle includes water, a co-solvent, and a surfactant; and
exposing the second build material layer to electromagnetic radiation, thereby fusing the portion of the build material layer in contact with the primer fusing agent to form a primer layer.

6. The method as defined in claim 5 wherein the cesium tungsten oxide nanoparticles are present in an amount ranging from about 1 wt % to about 20 wt %, based on a total weight of the primer fusing agent.

7. The method as defined in claim 6, further comprising:
applying a third build material layer on the primer layer;
applying a colored inkjet ink and i) the core fusing agent or ii) the primer fusing agent on at least a portion of the third build material layer; and
exposing the third build material layer to electromagnetic radiation, thereby fusing the portion of the third build material layer in contact with the i) the core fusing agent or ii) the primer fusing agent to form a colored layer having a colorant of the inkjet ink embedded therein.

8. The method as defined in claim 7 wherein prior to forming the core layer, the primer layer, and the colored layer, the method further comprises:
applying the colored inkjet ink on a sacrificial build material layer;
applying a fourth build material layer on the sacrificial build material layer;
applying the colored inkjet ink and i) the core fusing agent or ii) the primer fusing agent on at least a portion of the fourth build material layer;
exposing the fourth build material layer to electromagnetic radiation, thereby fusing the portion of the fourth build material layer in contact with the i) the core fusing agent or ii) the primer fusing agent to form a first colored layer having a colorant of the inkjet ink embedded therein;
applying a fifth build material layer on the first colored layer;
applying the primer fusing agent on at least a portion of the fifth build material layer; and
exposing the fifth build material layer to electromagnetic radiation, thereby fusing the portion of the fifth build material layer in contact with the primer fusing agent to form an initial layer;
and wherein the core layer is formed on the initial layer.

9. The method as defined in claim 6 wherein prior to exposing the first build material layer to electromagnetic radiation to form the core layer, the method further comprises applying the primer fusing agent on a second portion of the first build material layer adjacent to a perimeter defined by the core fusing agent, and wherein the exposing of the first build material layer to the electromagnetic radiation to form the core layer also forms a primer layer portion.

10. The method as defined in claim 9, further comprising applying a colored inkjet ink and i) the core fusing agent or ii) the primer fusing agent on a third portion adjacent to a perimeter defined by the primer fusing agent, and wherein the exposing of the first build material layer to the electromagnetic radiation to form the core layer also forms a colored layer portion adjacent to a perimeter of the primer layer portion.

11. The method as defined in claim 6 wherein the core fusing agent is a black fusing agent, and wherein prior to forming the primer layer, the method further comprises building a part core by forming several core layers with the black fusing agent.

12. The method as defined in claim 9 wherein the core layer is black.

13. The method as defined in claim 12 wherein the primer layer portion is white.

14. The method as defined in claim 6 wherein:
each of the first and second build material layers is formed with a same build material composition;
the core fusing agent is different from the primer fusing agent; and
the core fusing agent includes an infrared light absorbing colorant that is black.

15. A method for adding color to a part during three-dimensional (3D) printing, the method comprising:
selectively applying a core fusing agent on at least a portion of a first build material layer;
exposing the first build material layer to electromagnetic radiation, thereby fusing the portion of the first build material layer in contact with the core fusing agent to form a core layer;
applying a second build material layer on the core layer;
applying a primer fusing agent on at least a portion of the second build material layer, wherein the primer fusing agent includes:
cesium tungsten oxide nanoparticles;
a zwitterionic stabilizer, wherein the zwitterionic stabilizer is selected from the group consisting of a C2 to C8 betaine, a C2 to C8 aminocarboxylic acid having a solubility of at least 10 g in 100 g of water, taurine, and combinations thereof; and
an aqueous vehicle, wherein the aqueous vehicle includes water, a co-solvent, a surfactant, and a silane coupling agent; and
exposing the second build material layer to electromagnetic radiation, thereby fusing the portion of the build material layer in contact with the primer fusing agent to form a primer layer.

16. A method for adding color to a part during three-dimensional (3D) printing, the method comprising:
selectively applying a core fusing agent on at least a portion of a first build material layer;

exposing the first build material layer to electromagnetic radiation, thereby fusing the portion of the first build material layer in contact with the core fusing agent to form a core layer;

applying a second build material layer on the core layer;

applying a primer fusing agent on at least a portion of the second build material layer, wherein the primer fusing agent includes:
cesium tungsten oxide nanoparticles;
a zwitterionic stabilizer, wherein the zwitterionic stabilizer is selected from the group consisting of a C2 to C8 betaine, a C2 to C8 aminocarboxylic acid having a solubility of at least 10 g in 100 g of water, taurine, and combinations thereof; and
an aqueous vehicle, wherein the aqueous vehicle includes water, a co-solvent, and a surfactant;

exposing the second build material layer to electromagnetic radiation, thereby fusing the portion of the build material layer in contact with the primer fusing agent to form a primer layer;

applying a third build material layer on the primer layer;

applying a colored inkjet ink and i) the core fusing agent or ii) the primer fusing agent on at least a portion of the third build material layer; and exposing the third build material layer to electromagnetic radiation, thereby fusing the portion of the third build material layer in contact with the i) the core fusing agent or ii) the primer fusing agent to form a colored layer having a colorant of the inkjet ink embedded therein;

wherein prior to forming the core layer, the primer layer, and the colored layer, the method further comprises:
applying the colored inkjet ink on a sacrificial build material layer;
applying a fourth build material layer on the sacrificial build material layer;
applying the colored inkjet ink and i) the core fusing agent or ii) the primer fusing agent on at least a portion of the fourth build material layer;
exposing the fourth build material layer to electromagnetic radiation, thereby fusing the portion of the fourth build material layer in contact with the i) the core fusing agent or ii) the primer fusing agent to form a first colored layer having a colorant of the inkjet ink embedded therein;
applying a fifth build material layer on the first colored layer;
applying the primer fusing agent on at least a portion of the fifth build material layer; and
exposing the fifth build material layer to electromagnetic radiation, thereby fusing the portion of the fifth build material layer in contact with the primer fusing agent to form an initial layer;
wherein the core layer is formed on the initial layer;
and wherein the colored inkjet ink consists of a colorant, a dispersant, a co-solvent, water, and optionally an anti-kogation agent, a biocide, or combinations thereof.

17. A method for adding color to a part during three-dimensional (3D) printing, the method comprising:
sequentially forming part layers by:
applying individual build material layers; and
patterning the individual build material layers by:
selectively applying a core fusing agent on a first portion that is to be a dark color or black;
selectively applying a primer fusing agent on a second portion that is to be white or a color other than black, wherein the primer fusing agent includes:
cesium tungsten oxide nanoparticles present in an amount ranging from about 1 wt % to about 20 wt %, based on a total weight of the primer fusing agent;
a zwitterionic stabilizer, wherein the zwitterionic stabilizer is selected from the group consisting of a C2 to C8 betaine, a C2 to C8 aminocarboxylic acid having a solubility of at least 10 g in 100 g of water, taurine, and combinations thereof; and
an aqueous vehicle, wherein the aqueous vehicle includes water, a co-solvent, and a surfactant; and
selectively applying a colored inkjet ink on the second portion, wherein the colored inkjet ink consists of a colorant, a dispersant, a co-solvent, water, and optionally an anti-kogation agent, a biocide, or combinations thereof.

18. The method as defined in claim 17, further comprising exposing the individual build material layers to electromagnetic radiation.

* * * * *